United States Patent [19]
Newman

[11] Patent Number: 5,222,085
[45] Date of Patent: Jun. 22, 1993

[54] SELF-ROUTING SWITCHING ELEMENT AND FAST PACKET SWITCH

[76] Inventor: Peter Newman, 750 N. Shoreline Blvd., Apt. 69, Mountain View, Calif. 94043

[21] Appl. No.: 602,409

[22] Filed: Oct. 22, 1990

Related U.S. Application Data

[63] Continuation-in-part of Ser. No. 258,291, Oct. 14, 1988, Pat. No. 4,965,788, and a continuation-in-part of Ser. No. 582,254, Sep. 14, 1990, abandoned.

[51] Int. Cl.[5] .......................... H04Q 11/04; H04J 3/24
[52] U.S. Cl. ........................................ 370/60; 370/94.1
[58] Field of Search ................. 370/58.1, 58.2, 58.3, 370/60, 60.1, 85.1, 94.1

[56] References Cited

U.S. PATENT DOCUMENTS

| | | | |
|---|---|---|---|
| 4,482,996 | 11/1984 | Wilson et al. | 370/60 |
| 4,488,151 | 12/1984 | Bolton et al. | 370/85.1 |
| 4,621,359 | 11/1986 | McMillen | 370/94.1 |
| 4,630,260 | 12/1986 | Toy et al. | 370/94.1 |
| 4,661,947 | 4/1987 | Lea et al. | 370/94.1 |
| 4,707,831 | 11/1987 | Weir et al. | 370/94.1 |
| 4,731,878 | 3/1988 | Vaidya | 370/60 |
| 4,734,907 | 3/1988 | Turner | 370/94.1 |
| 4,764,919 | 8/1988 | Hunter et al. | 370/60 |

FOREIGN PATENT DOCUMENTS 2151880 7/1985 United Kingdom .

OTHER PUBLICATIONS

"Binary Routing Networks", Milway D. R., U. of Cambridge Computer Lab, Tech. Report No. 101, Cambridge, England, Dec. 1986 (Entire document).

*Primary Examiner*—Douglas W. Olms
*Assistant Examiner*—Alpus H. Hsu

[57] ABSTRACT

A self-routing switching element in a packet switch functions in a packet synchronous mode in which a plurality of the incoming packet signals are switched by the switching element concurrently during a common time period. For each incoming packet signal received during the common time period, the switching element detects that one of the inputs has an incoming packet signal for transmission to one of the outputs, determines if the one of the output modules will accept the incoming packet signals, and responsive to the determination, enables the acceptance of the incoming packet signal by the output module for transmission to the output. The control circuitry is distributed throughout the switching element in output modules, one module for each output from the switching element.

2 Claims, 9 Drawing Sheets

SELF-ROUTING SWITCHING ELEMENT AND FAST PACKET SWITCH

This application is a continuation-in-part of the above-identified cross-referenced applications Ser. No. 07/258,291, filed 10/14/88, now U.S. Pat. No. 4,965,788 and U.S. Pat. No. 07/582,254, filed 09/14/90, now abandoned.

CROSS-REFERENCE TO RELATED APPLICATIONS

U.S. patent application Ser. No. 07/258,291 Filed: Oct. 14, 1988, now U.S. Pat. No. 4,965,788 Title: SELF-ROUTING SWITCHING ELEMENT FOR AN ASYNCHRONOUS TIME SWITCH.

U.S. patent application Ser. No. 07/582,254 Filed: Sep. 14, 1990, now abandoned Title: SELF-ROUTING SWITCHING ELEMENT AND FAST PACKET SWITCH

BACKGROUND OF THE INVENTION

The present invention relates to fast packet switching and particularly to self-routing packet switching in a communication system.

In a communication system, the ability to transmit many diverse forms of information (such as voice, video, image, graphics, text, computer data, control data, electronic funds and electronic mail) in an integrated manner, has long been needed. Information to be transferred through a system is conveniently classified into two categories. Real time signals such as voice and video represent one class that presents a reasonably constant traffic load to the system. This class tolerates relatively high losses and error rates within the system, but this class is not tolerant of delays and delay variances. Data signals such as computer data and electronic funds represent a class that presents a rapidly fluctuating traffic load to the system. Although this class is intolerant of errors, this class can tolerate long and variable delays. Due to the different characteristics of these two classes of traffic, two different methods of switching have developed, namely circuit switching for real time signals and packet switching for data signals.

Although many attempts have been made to integrate circuit and packet switching, further improvements are still needed for a commercially successful integrated communications system. Some such improvements are described in the above cross-referenced applications.

In the cross-referenced applications, self-routing switching elements are employed to form a high-capacity, fast-packet switch having the capability of handling both voice and data traffic by virtue of the use of small packets in combination with virtual circuits across the system.

In the cross-referenced applications, the self-routing switching elements include a plurality of selectors each having an input for incoming tagged packet signals; a plurality of arbiters each having an output for transmitted packet signals, and a signal path connection between each selector and each arbiter; each selector being operable to examine the tag of an incoming packet signal and route the packet signal to the arbiter identified by the examined tag, and each arbiter being operable to select one of the packet signals received from any of the selectors and transmit that packet signal to its output, at the same time acting on other selectors to prevent the transmission of subsequent packet signals until the transmission of the selected packet signal is complete.

The input port controllers, the output port controllers, and the switch fabric each work independently, without any requirement for central control, upon the packets which arrive at their inputs. In general, each input port controller can be fed from a queue of incoming packets in an input buffer and each output port controller can feed an output buffer. The structure of the switch fabric is a multi-stage interconnection system constructed from a number of identical switching elements connected in stages. The throughput of the structure is increased by connecting multiple planes in parallel to offer multiple paths between each input/output pair of controllers.

In the basic operation of the switch, the input port controller provides a packet tag to the head of each input packet. This tag indicates the desired destination of the packet and may consist, for example, of the binary representation of the destination output port number. The value of the tag may be derived from virtual circuit connection information within each packet. The interconnection system is arranged so that to forward an input packet towards the desired destination, a switching element selects the digit(s) within the tag, corresponding to the current stage within the system, and forwards the packet over the corresponding output. The switching elements may contain internal buffers, to form a buffered system, or may not, to form a non-buffered system. Buffered systems offer greater throughput per switching element but voice packet priority is more difficult than in a non-buffered system.

In the cross-referenced applications, each connection consists of a forward path carrying packets forward and a reverse path which carries a reverse signal back towards the input controller. The input controller first operates to launch a packet into the switch fabric. If the destination port is busy, or if no free path through the switch fabric is available, the switch fabric in one embodiment returns a busy signal shortly after the input port controller has launched the last bit of the tag into the switch fabric. On receiving a busy signal, the input controller abandons the attempted transmission of the packet, removes the attempt from the switch fabric and waits for a short period (typically equivalent to about 10 percent of the duration of a packet). After this period the input controller makes another attempt at transmitting the packet, and so on, until transmission is successful. A packet transmission is assumed to be successful if no busy signal is received by the end of transmission of the packet.

The throughput of the switch fabric of the cross-referenced applications is enhanced by the use of large size switching elements and by the use of multiple paths through the switch fabric between every input/output controller pair using a mechanism for locating a free path to the destination from the set of all equivalent paths.

While the cross-referenced applications are substantial improvements in providing fully integrated packet switches, still additional improvements are needed.

SUMMARY OF THE INVENTION

The present invention is a self-routing switching element for use in a packet switch and a packet switch formed from such switching elements. Each incoming packet signal to a switching element has tags for use in controlling the switching of the packets through the switching element. The switching element includes a plurality of inputs receiving the incoming packet signals and includes a plurality of output modules for receiving the packet signals from the inputs and transmitting the packet signals to the outputs.

The switching element functions in a packet synchronous mode in which a plurality of the incoming packet signals are switched by the switching element concurrently during a common time period. For each incoming packet signal received during the common time period, the switching element includes detector means to detect that one of the inputs has an incoming packet signal for transmission to one of the outputs, includes determining means for determining if the one of the output modules will accept the incoming packet signal, and includes enable means, responsive to the determining means, for enabling the acceptance of the incoming packet signal by the output module for transmission to the output.

The control circuitry (including the packet detector means, the acceptance determining means, and the transmission enable means) is distributed throughout the switching element in output modules, one module for each output from the switching element. In order for the control circuitry in each output module to determine which particular one, among a plurality of input packets competing for an output module, is to be accepted, each of the output modules relies upon information from each of the competing inputs.

In one embodiment, all of the output modules are connected by a common bus where the bus has both forward and reverse signal paths. The forward signal paths transport the input packets from input to output while the reverse signal paths signal when a packet has been accepted or rejected.

In one embodiment, the reverse signal paths carry acknowledgment signals generated by the output controller and propagated back through the switch fabric to the input controller when a packet signal has been received by the output controller. In another embodiment, the reverse signals are rejection signals propagated by the output modules in the switching element and/or by the output controller when the input packet signal is not to be transmitted by the packet switch. In the absence of an acknowledgment signal, or in the presence of a rejection signal, the input controller resends the packet signal until the input packet signal is received by the output controller.

In a typical embodiment of the present invention, input packet signals include priority tags for indicating the priority of the input packet signals. The priority is used to determine among competing inputs which one or ones will be transmitted through the packet switch. Typically, the priority has multi-level values and packet signals may have priorities the same as other packet signals during the same common time period. A parallel priority unit is provided at each output module for examining the priority tags of input packet signals and for identifying the one or more ones of the input packet signals having the currently highest priority among those concurrently requesting transmission by the packet switch.

The present invention includes within each switching element acceptance determining means for determining which one of the input packets competing for acceptance will actually be accepted. When a priority unit is employed for input packets having a preassigned priority, the determining means determines, among the input packets having the highest priority then currently present, for determining which one or more of such input packets will be accepted.

In one embodiment, the determining means includes a binary tree arbiter for selecting among pairs of competing inputs of those inputs having the currently highest priority. The binary tree arbiter selects among requesting pairs of input packets to establish a forward connection path and returns a reverse signal through the selected one of the forward pairs to select a particular one of the input packets.

In one embodiment, the arbiter unit employs a preference counter which is stepped each time an input packet is accepted. The preference counter represents the history of previously granted access and therefore acts to promote fairness among the selection of competing input packet signals since input packets more recently selected are less likely to be selected again relative to less recently selected input packets.

In order further to promote fairness among the competing input packets, one embodiment employs a pseudo-random number generator for loading the preference counter whereby the selection of competing input packet signals tends to be random.

In the present invention, the switch fabric between the input ports and the output ports includes a single switching element in one embodiment and in another embodiment includes a plurality of cascaded switching elements in switching stages. In such switching fabrics, a plurality of different paths may exist between input ports and output ports. When such a plurality of paths exists, one embodiment of the present invention employs a pseudo-random generator for randomly selecting between the alternate paths within the switching fabric.

In another embodiment of the present invention, two or more switching fabrics are connected in parallel whereby parallel alternate paths are provided from each input port to each output port.

In one embodiment of parallel switching fabrics, the timing of the signals in the parallel switch fabrics are skewed whereby a packet signal which is launched but rejected for transmission through one switch fabric is thereafter launched for transmission through another parallel switch fabric. With the skewing of the launching of packet signals into parallel switch fabrics, input packets are more efficiently routed through the switch fabric from the input controllers to the output controllers.

In accordance with the above summary, an improved switching element and packet switch for fully integrated voice and data is described.

Other objects, features, and advantages of the present invention will become more apparent in the light of the following detailed description thereof, as illustrated in the drawings.

DESCRIPTION OF THE DRAWINGS

General—Fast Packet Switching

Fast packet switching, also known as asynchronous transfer mode (ATM), combines the desirable features of both circuit switching and packet switching into a single integrated switching communication system. It offers low delay, reasonably low variance of delay, high capacity switches, greatly enhanced flexibility, efficient support of bursty traffic, and the ability to handle variable bandwidth traffic.

Figure 1:
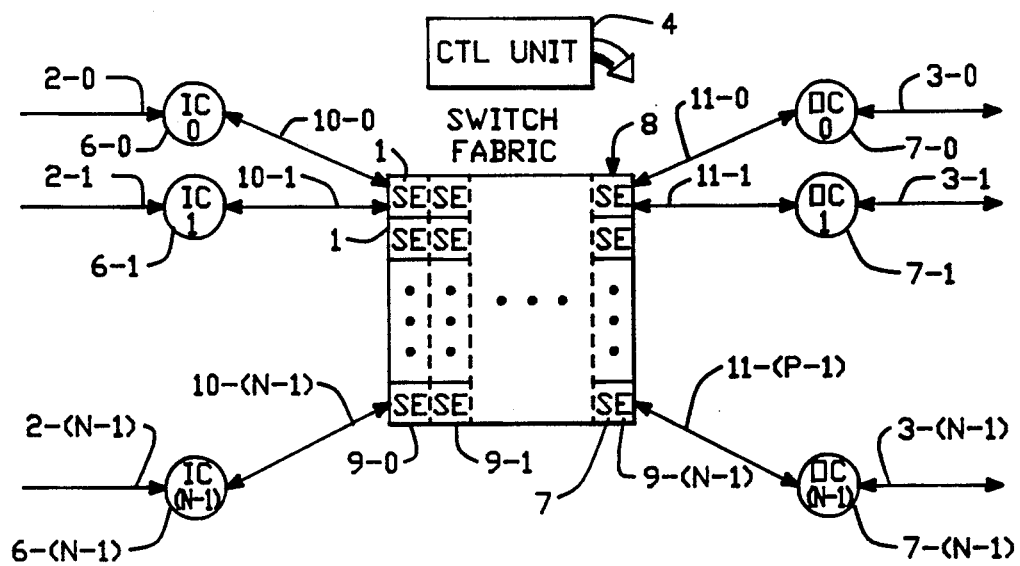
FIG. 1 depicts a communication system with input controllers connected by a switch fabric to output controllers.

In general, referring to FIG. 1, a broadband fast packet switch has three fundamental components namely, the switch control unit 4, the input/output controllers 6 and 7, and the switch fabric 8. The switch control unit 4 typically includes a processor for control of the entire switch, a clock unit for providing timing signals, and other components useful in a communication system. The input/output controllers 6 and 7 interface the incoming and outgoing packets to the switch fabric 8. Each input/output controller typically stores packet queues and has the input and output port control circuitry for establishing a single full-duplex switch port.

Each input port controller 6 typically contains a look-up table indexed by a packet label in the incoming packet signal on input port line 2. The look-up table contains a number of parameters defining each connection established across the input port. These parameters will include an outgoing label, the class of service (used for example to establish priority) of the connection, and the output port across which the connection is routed. The input port receives an incoming packet and performs a table look-up on the label field to translate the label and to determine the output port through which the packet is routed. It prefixes the port number of the required output port to the front of the packet as a routing tag, and if buffers are employed, stores the packet in the input buffer thereby establishing one or more first-in-first-out (FIFO) packet queues. More than one queue may be employed, for example, with multiple classes of service and multiple priorities. Concurrently with the reception of incoming packets, the input port controller removes the packet at the head of the input buffer, adds a priority tag to the front of the packet, and initiates a transmission attempt by launching the packet into the switch fabric.

There are two possible outcomes after an input controller launches a packet into the switch fabric, either the packet will reach the desired output port or it will not. A transmission attempt may fail to reach the output port either because it is blocked by other traffic within the switch fabric or because the requested output port has accepted an alternative packet.

The packet switch employs a reverse signal to communicate whether or not the packet transmission from input port to output port is successful. If the attempt is successful, in one embodiment, the output port controller immediately sends an acknowledgement signal (ACK) back to the input port controller across a reverse path. The ACK signal may be received by the input port controller as soon as a few bit times after transmission of the routing tag. If no ACK signal is received within a fixed time interval, the transmission attempt is considered to have failed.

In an alternative embodiment, the reverse signal is a rejection signal, transmitted as soon as it is determined that the packet signal will not complete transmission. If an attempt is successful, the packet continues to be transmitted across the switch fabric until completion. If an attempt fails the input port controller aborts that attempt, clears the failed packet path, waits a fixed time interval and then attempts to send the packet (or possibly a different packet) once again. The input controller continues to send and resend until transmission of a packet is successful or until a limit designed to detect fault conditions is exceeded.

There are three modes of synchronization at the packet level in which the switch fabric of an input buffered fast packet switch may be operated, namely, packet synchronous, retry synchronous or packet asynchronous. In packet synchronous operation, a local timing reference is provided which generates a series of timeslots, each timeslot being exactly one packet in length. All input port controllers are synchronized so as to commence each packet transmission attempt at the beginning of a timeslot. Only one transmission attempt from each input port controller is permitted during each timeslot. If an input port controller fails on a transmission attempt, the input port controller remains idle until the next timeslot. All packet boundaries are thus aligned but all packets must be of the same length.

In retry synchronous operation, a local timing reference is still provided but it defines the retry time. This is a higher frequency than that of the timeslot signal of the packet synchronous mode. All input port controllers are synchronized so as to commence a transmission attempt at the beginning of the retry period. Thus a number of attempts retries are permitted within the duration of a packet length. If an input port controller fails on any attempt it merely has to wait until the next retry period before it can try again which will typically be a delay of no more than a few tens of bits. Packet boundaries are no longer aligned with each other but occur at a small number of permissible times defined by the retry signal. Variable length packets may be handled.

Packet asynchronous operation allows each input port controller to operate asynchronously at the packet level. The switch is bit synchronous but packet boundaries may occur at any bit transition. If an input port controller fails on a packet transmission attempt it clears the failed path and waits for a fixed interval (the retry delay) before submitting another attempt. The retry delay is typically of the order of a few tens of bits. Variable length packets may be handled.

Packet synchronous operation leads to a simpler implementation as all packet boundaries occur together and at regular intervals. This feature is important for a switch with ports operating at high data rates. Also, the switch fabric supports a number of levels of packet priority. When two packets compete for the same internal link or output port, the switch fabric typically decides which packet to accept and which packet to reject upon the basis of a priority field.

Packet synchronous operation generally requires a lower implementation complexity using multiple levels of packet priority.

Packet Switch—FIG. 1

The overall structure of a packet switch is shown in FIG. 1. The input controllers 6, the output controllers 7, and the switch fabric 8 each work independently, without any requirement for central control. Packets which arrive at the input ports 2 are connected across to the output ports 3. In general each input controller 6 is fed from a queue of incoming packets and each output controller feeds an output queue.

The switch fabric 8 is an interconnection system constructed from one or more switching elements 1 connected in one or more stages 9-0, 9-1, . . . , 9-(N-1).

In operation of the packet switch of FIG. 1, all incoming packets at ports 2 have packet headers which contain packet control information and packet data. The packet control information indicates, among other things, the desired port destinations of the packets. The packet switch is arranged so that in order to forward an input packet towards the desired destination port, a switching element merely selects the digit(s) within a tag derived from the packet control information, corresponding to the current stage within the switch fabric 8, and forwards the packet over the output identified by the tag to the input of the next stage. The packet proceeds from stage to stage with each stage examining the current stage tag to select the desired output until the packet arrives at the output port.

The switching elements of the embodiments described are non-buffered and the connections between switching elements each includes two signal paths, a forward path which carries the packet as a forward signal and a reverse path which carries a reverse signal back towards the input controller.

In FIG. 1, the N input controllers 6-0, 6-1, . . . , 6-n, . . . , 6-(N-1) are connected by N input packet buses 10-0, 10-1, . . . , 10-n, . . . , 10-(N-1) to a switch fabric 8. Switch fabric 8 switches packet signals from the input controllers 6 on buses 10 to output buses 11 including P output buses 11-0, 11-i, . . . , 11-p, . . . , 11-(P-1). The output buses 11 in turn connect to the P output controllers 7-0, 7-1, . . . , 7-p, . . . , 7-(P-1) which in turn connect to P output ports.

In FIG. 1, the switch fabric 8 includes one or more stages 9 of switching elements 1, including for example the Q stages of switching elements 9-0, 9-1, . . . , 9-q, . . . , 9-(Q-1).

In a typical embodiment of FIG. 1, the number of input controllers N is equal to the number of output controllers P. Generally, however, N and P may be different integers. In FIG. 1, the number Q of stages of switching elements 1, in general, can be any integer.

In general, throughout this specification, the integer "N" for convenience has been used to designate a value that is variable, but "N" for one parameter does not necessarily equal "N" for some other parameter.

Figure 2:
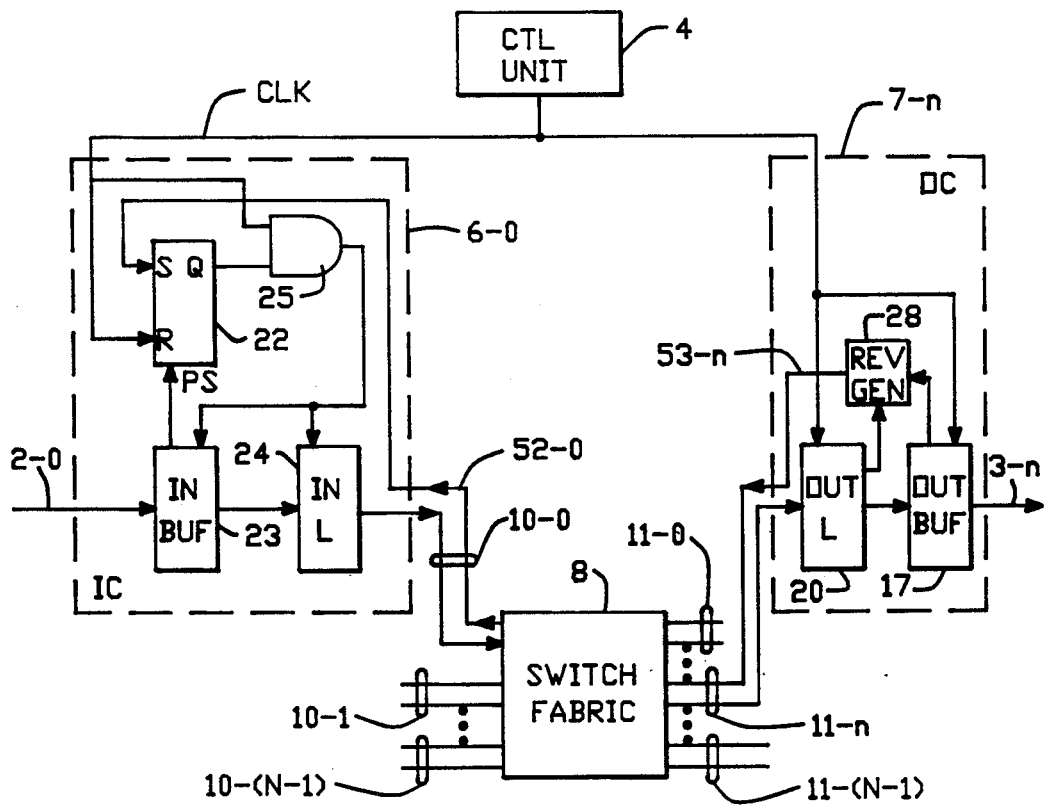
FIG. 2 depicts a typical input controller IC) connected through a switch fabric to a typical output controller (OC) as part of the communication system of FIG. 1.

Input/Output Controllers—FIG. 2

In FIG. 2, an embodiment of the FIG. 1 communication system is depicted with a typical input controller (IC) 6-0 and a typical output controller (OC) 7-n connected through a switch fabric 8.

The bi-directional paths 10-0 for the input controller 6-0 are connected through the switch fabric 8 to the bi-directional output connection paths 11-n for the particular one of the output controllers 7-n specified by tags associated with the input packet signals in the input controller 6-0.

In FIG. 2, the packet signals on input port 2-0 typically connect through an input buffer 23 to the input controller 6-0. Input buffer 23 is optionally part of the input controller 6-0 or may be external to the controller. In one embodiment, input buffer 23 is a first-in-first-out (FIFO) buffer which receives a plurality of input packet signals which are intended for distribution to particular ones of the output controllers 7 of FIG. The packet signals input from the port 2-0 have tags which specify, among other things, a particular one of the output ports 3 as connected through the switch path fabric 8 and a particular one of the output controllers 7. The switch fabric 8, in response to the tags of packets signals input to the controllers 6 of FIG. 1 and specifically the input controller 6-0 of FIG. 2, transmits the input packet signals to a particular one of the output port controllers 7 and the corresponding output port 3.

In FIG. 2, the input buffer 23 typically provides an output to an input latch 24 in response to a "send next packet" signal, for example, from the AND gate 25. The input packet to be transmitted is transferred from the input buffer 23 to the input latch 24 for transmission through the switch fabric 8 in response to the signal from the AND gate 25. Typically the input latch 24 is merely the output stage of the input buffer 23.

In FIG. 2 the input controller 6-0 includes a transmission latch 22 which controls the transmission (launching) of a packet signal from the input controller 6-0 into the switch fabric 8. The input buffer 23 provides a preset (PS) signal to the latch 22 which presets latch 22 to enable the Q output whenever the input buffer 23 is empty and is ready to receive input packet signals from the input port 2-0. When input buffer 23 has received data for output to the switch fabric 8, the preset signal to the latch 22 is removed. The reset (R) input to the latch 22 is actuated by each clock signal from the control unit 4 provided the latch is not preset by the output from the input buffer 23. After the preset input to the latch 22 is removed, latch 22 is reset to disable the AND gate 25 each time a clock signal is received from the control unit 4. When latch 22 is reset, the output from AND gate 25 inhibits any further transmission of packet signals from the input buffer 23 and latch 24 from being transmitted over the switch fabric 8 unless an acknowledge signal (ACK) is returned on the reverse signal path 52-0 on the bus 10-0 from the switch fabric 8. If the reverse signal in the form of an acknowledge signal appears on line 52-0, the latch 22 is set, AND gate 25 is enabled and the next clock signal from the clock unit 4 will cause a new packet signal to be transmitted from the buffer 23 and latch 24 through the switch fabric 8 to a particular one of the output modules, module 7-n.

In FIG. 2, when a particular one of the modules 7-n receives a packet signal transmitted by the input module 6-0, the output module stores the packet into the output latch 20 and that packet is detected by the reverse generator 28. The reverse generator 28 initiates a reverse signal in the form of an acknowledge signal (ACK) on the output line 53-n which is propagated back through the switch fabric 8 to the line 52-0 to set the transmission latch 22 thereby enabling the sending of a new packet from the input buffer 23 and input latch 24. The forward path of packet signals from the input module 6-0 over the bus 10-0 to the output bus 10-n is the same as the reverse path of reverse signals from the path 10-n through the switch fabric 8 to the input bus 10-0. Accordingly, the switch fabric 8 operates to establish both a forward connection path and a reverse connection path through the switch fabric 8 as a function of the input tags for input packet signals in the input controller 6-0. Of course, the input controller 6-0 is typical of all of the input controllers 6-0 through 6-(N-1) of FIG. Similarly, the output controller 7-n of FIG. 2 is typical of all of the output controllers 7-0 through 7-(N-1) of FIG. 1.

Each of the input controllers 6 can transmit a packet into the switch fabric 8 at the same time as each of the other input controllers. Each input controller 6 and each output controller 7 receives the same clock signal (CLK) from the control unit 4 so that the operation of the packet switch of FIG. 1 and FIG. 2 is packet synchronous.

Figure 3:
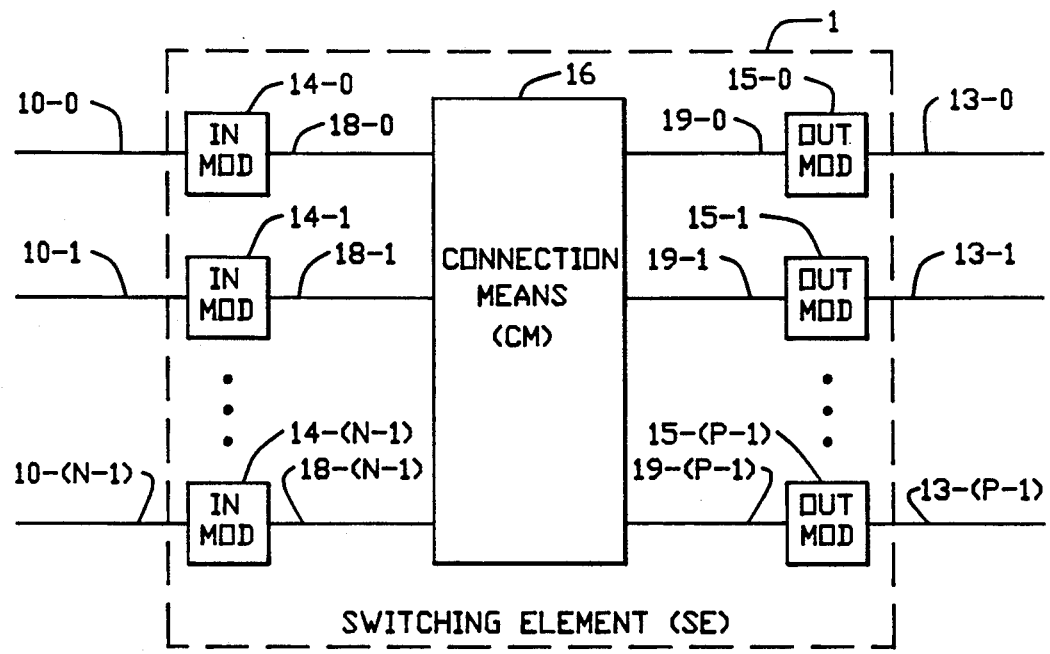
FIG. 3 depicts a typical switching element for use in the switch fabric of FIG. 1.

Switching Element—FIG. 3

In FIG. 3, a typical one of the switching elements 1 of FIG. 1 is shown. The switching element 1 includes the N input buses 10-0, 10-1, ..., 10-n, ..., 10-(N-1) connected to the N input modules 14-0, 14-1, ..., 14-n, ..., 14-(N-1). The input modules 14 in turn connect over the N input buses 18-0, 18-1, 18-n, ..., 18-(N-1), respectively, to connection means (CM) 16. The connection means 16 in turn connects over P output buses 19-0, 19-1, ..., 19-p, ..., 19-(P-1) to the P output modules 15-0, 15-1, 15-p, 15-(P-1), respectively, where P typically equals N.

In FIG. 3, the output modules 15 connect respectively to the P output buses 13-0, 13-1, ..., 13-p, ..., 13-(P-1). In FIG. 3, the output buses 13 are the output buses 11 of FIG. 1 in the embodiment where the switch fabric 8 includes a single switching element 1. In the embodiment where the switching element 8 of FIG. 1 includes more than one switching element 1, then the output buses 13 of the FIG. 3 switching element connect, respectively, to the input buses 10 of the next cascaded switching element 1. Each switching element 1 is cascaded from input to output within the switch fabric 8 of FIG. 1 when a plurality of switching elements i are employed. The outputs from the last stage of switching elements connect as the busses 11 in FIG. 1.

Figure 4:
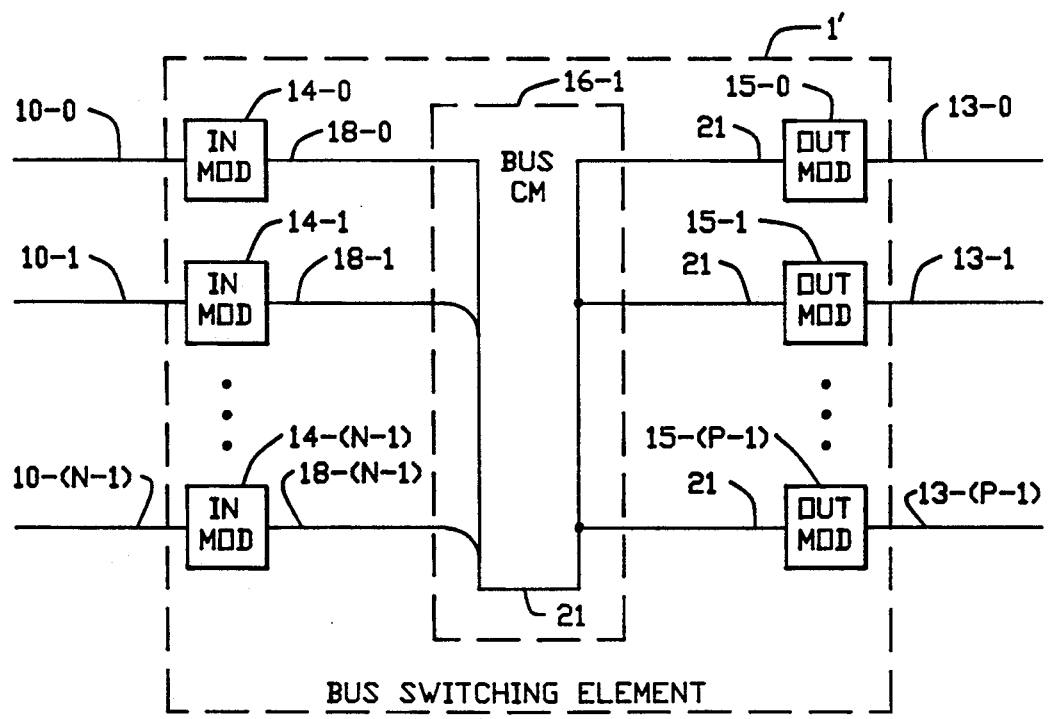
FIG. 4 depicts a bus switching element which is one embodiment of the switching element of FIG. 3.

Bus Switching Element—FIG. 4

FIG. 4 depicts a switching element 1' which is one preferred embodiment of the switching element 1 of FIG. 3. The switching element 1' of FIG. 4 is like the switching element of FIG. 3 with the further detail that the connection unit 16 of FIG. 3 is a bus connection unit 16-1 in FIG. 4. The bus connection unit 16-1 receives each of the N input module buses 18-0, 18-1, ..., 18-n, 18-(N-1) and connects those buses in parallel to form the common bus 21. Common bus 21 is then connected in parallel to each of the output modules 15-0, 15-, ..., 15-p, ..., 15-(P-1) where P is typically equal to N.

In FIG. 4, the common bus 2 is one implementation equivalent to each of the buses 19-0, 19-1, ..., 19-p, ..., 19-(P-1) of FIG. 3.

While the common bus connection means 16-1 of FIG. 4 is one preferred embodiment of the present invention, alternative non-bus, directly connected, connection means 16 are described in the above-identified cross-referenced copending application.

Regardless of the implementation of the connection means 16 of FIG. 3, each of the input modules 14 in a switching element 1 has a connection path to each of the output modules 15 so that input packet signals at any one of the input modules 14 can be connected to any one of the output modules 15.

Figure 5:
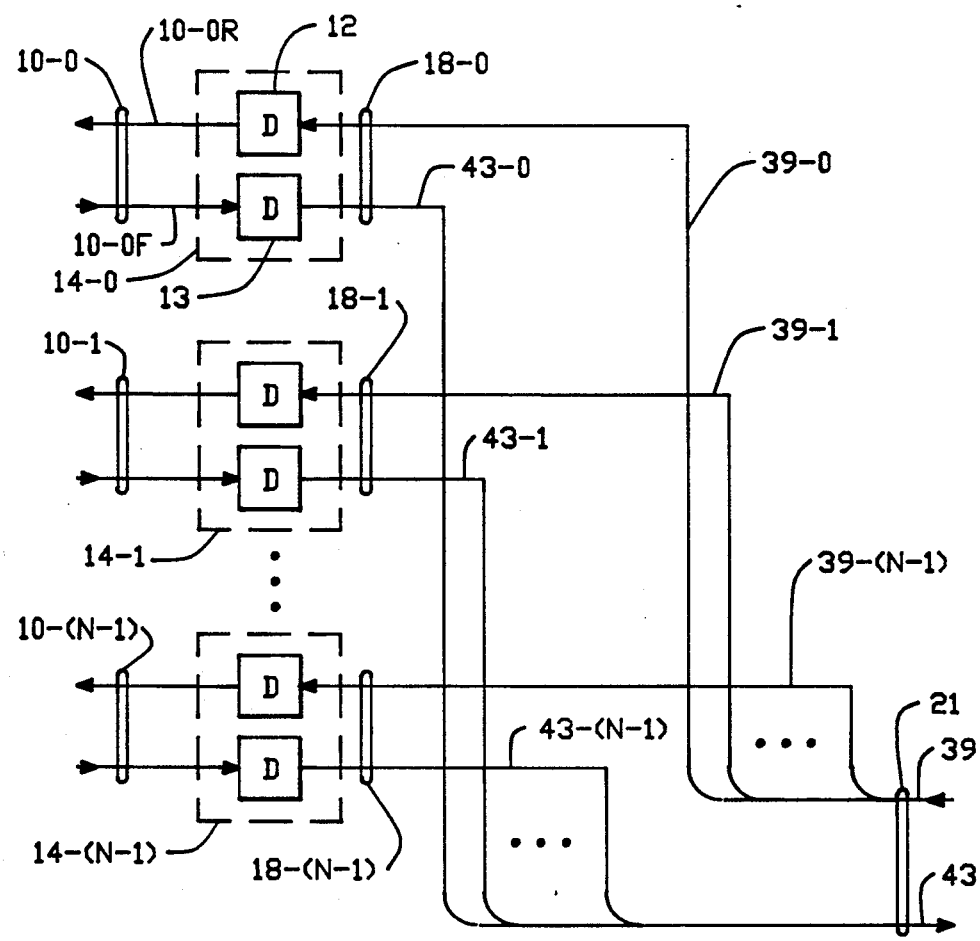
FIG. 5 depicts typical input modules and bus connections which form part of the bus switching element of FIG. 4.

Input Module—FIG. 5

In FIG. 5, a typical one of the input modules 14 of FIG. 4 is shown. In FIG. 5, the input modules 14 receive the input buses 10. For example, input bus 10-0 connects to the input module 14-0. The input module 14-0 in the example of the bus switching element 1, of FIG. 4 may include little or no circuitry. In FIG. 5, for example, the input 10-0 or the input module 14-0 has a forward bus 10-0F connected to bus drivers 13 to produce forward packet signals on the input bus 43-0. Similarly the input module 4-0 includes drivers 2 for receiving the reverse path 39-0 for connection to the reverse output 10-0R. In one embodiment of the bus switching element 1' of FIG. 4, the input bus 10-0F is a multi-line bus (for example, 8 or more lines) connected through corresponding driver circuits 13 to drive the bus 43-0 (including a corresponding number of 8 or more lines). The reverse signal path on line 39-0 is typically a single line through the single line driver 12 to the single line output 10-0R. Of course, the reverse signal path on line 39-0 may include, if appropriate, multiple lines for reverse signal communication.

In FIG. 5, each of the input modules 14-0, 14-1, ..., 14-(N-1) provides corresponding multi-line outputs 43-0, 43-1, ..., 43-(N-1) which collectively form the multi-bus, multi-line bus 43. Similarly, each of the input modules 14-0, 14-1, ..., 14-(N-1) receives the single line inputs 39-0, 39-1, ..., 39-(N-1), respectively, which form the multi-line reverse bus 39. Together, the multi-line reverse bus 39 and the multi-line, multi-bus forward bus 43 comprise the common bus 21.

As shown in FIG. 4, the common bus 21 of FIG. 4 and FIG. 5 connects in common to each of the output modules 15-0, 15-1, ..., 15-(N-1). With the common bus structure of the bus connection means 16-1 of FIG. 4, each of the individual buses 18-0, 18-1, 18-(N-1) is connected to each one of the output modules 15-0, 15-1, ..., 15-(P-1) whereby any one of the input modules 14 can be connected to any one of the output modules 15.

Figure 6:
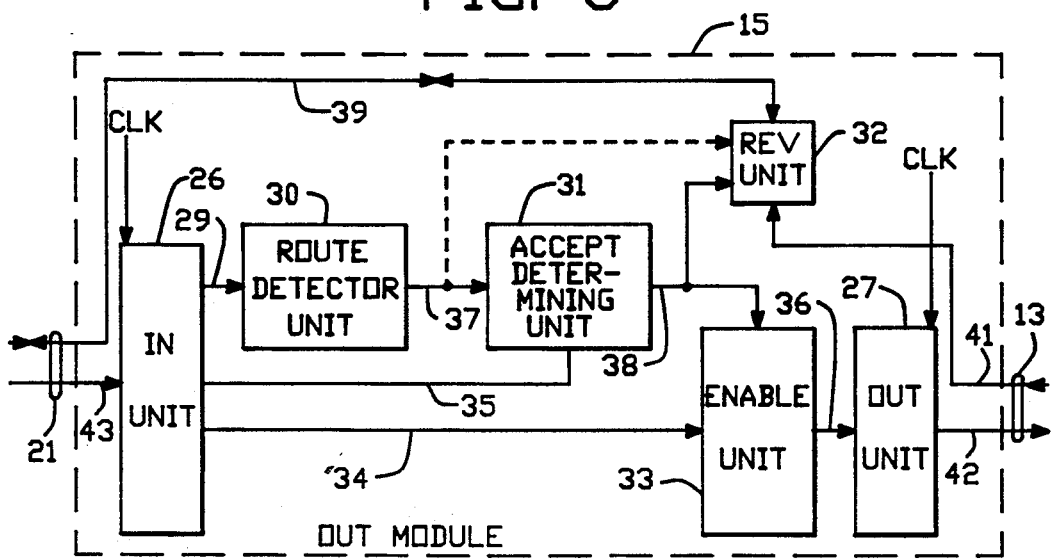
FIG. 6 depicts an output module which is part of the bus switching element of FIG. 4.

Output Module—FIG. 6

In FIG. 6, one typical embodiment of the output module 15 of FIG. 4 is shown. In FIG. 6, the input bus 21 to the output module 15 is the common bus 21 of FIG. 4 and of FIG. 5. The bus 21 includes connections to a forward bus 43 and a reverse bus 39. Similarly, the output from the output module 15 includes a forward bus 42 and a reverse line 41 for connection to the reverse bus 39.

In FIG. 6, the forward bus 43 connects to an input unit 26. Typically the input unit 26 includes one or more input registers for receiving the forward packet signals input on multiple input bus 43. The forward packet signals include tag packet signals for controlling, among other things, the route of the packet signals through the switch fabric 8. The control unit 4 of FIG. 1 typically provides common clock signals (CLK) to each of the output modules 15 (for example, for clocking registers in the input unit 26) to clock the output modulos in packet synchronous mode.

Separate buses, tag buses and data buses, may be provided as one embodiment of forward bus 43 for the forward tag packet signals and the forward data packet signals whereby the input unit 26 can receive tag and packet signals in parallel.

Alternatively, a single time-multiplexed bus, as another embodiment of forward bus 43 may connect to the input module 26 whereby the tag and data packet signals are received on a time-multiplexed basis, first receiving the tag packet signals and thereafter receiving the data packet signals. In either the parallel or time-multiplexed embodiment, the tag packet signals are connected from the input unit 26 to a route detector unit 30. The route detector unit 30 determines whether any of the packet signals on the common bus 21 are requesting a particular one of the output modules 15 of FIG. 4. Each of the output modules 15-0, 15-1, ..., 15-p, ..., 15-(P-1) of FIG. 4 has a route detector, like route detector 30 of FIG. 6, and each of the output modules 15 of FIG. 4 examines the tags on the common bus 21 to determine if the particular output module is a candidate to receive the packet signals on the common bus 21. Since there are N input modules 14 each having the capacity of having a packet signal for a particular one of the output modules 15, each route detector 30 is capable of detecting from 0 to N packet signals that are concurrently competing for access to a particular one of the output modules 15. Each route detector 30 detects which ones of the N input modules are competing for the particular output module 15 and identifies each competing packet signal on the output bus 37.

For N input modules 14, each route detector unit 30 and each output module 15 identifies from 0 to N modules that are competing for access to the particular output module with which the route detector unit 30 is associated. Accordingly, each output bus 37 in each one of the output modules 15 identifies from 0 to N requesting inputs.

Each route detector unit 30 is implemented in a conventional manner. For example, each input module provides a route packet signal tag on the output bus 43 for each of the output buses 43-0, 43-1, ..., 43-(N-1). Route detector unit 30 in each output module 15 has a route tag detector for each of the N buses 43 whenever the route tag decoder within the route detector unit 30 detects that the particular one of the buses 43-0, 43-1, ..., 43-(N-1) has a route tag specifying the particular output module of the associated route detector unit 30, the output from the route detector unit 30 on output lines 37 is asserted to identify the request for the particular output module. In a conventional manner, the output from the route detector unit 37 is N lines, one each for the corresponding input modules 14, which is either asserted or not asserted to identify the request for the corresponding output module.

In FIG. 6, the route tags are connected from the input unit 26 over the lines 29 to the route detector unit 30. The route detector unit 30 detects which ones of the input modules 14 are competing for access to the output module 15. The route detector unit 30 provides on the output lines 37 the particular ones of the input modules which are requesting access to the output module 15.

In FIG. 6, output module 15 typically can accept less than all (and only one in the particular embodiment described) of the requesting input modules. Of the requesting input modules, identified on lines 37, the acceptance determining unit 3 determines which one or more of the requesting input modules will be accepted by the output module 15. The particular one, in the embodiment described, of the accepted requesting inputs is identified on the output lines 38. The accepted one of the requesting inputs as signified by an acceptance output on lines 38 is connected as an input to the enable unit 33. The enable unit 33 responsively selects, for the accepted one or ones of the requesting inputs, the packet signals on bus 34 from the input unit 26, corresponding to the input packet signals on bus 43, for connection to the output bus 36 and the output unit 27. The control unit 4 of FIG. 1 typically provides common clock signals (CLK) to each of the output modules 15 (for example, for clocking registers in the output unit 27) to clock the output modules in packet synchronous mode. The selected ones of the input packets on bus 43, bus 34, and output bus 36 are input to the output unit 27 for transmission over the output bus 42. In the preferred embodiment described, only a single one of the input packet signals from one of the input modules 14 is selected for connection over the forward output bus 42. The forward output bus 42 together with the reverse line 41 comprise the output bus 13 from the output module 15. As indicated in FIG. 3, each output module 15 has a corresponding output bus 13 (having both a forward and a reverse connection path). As indicated in FIG. 1, in an embodiment whereby the switch fabric 8 of FIG. 1 is a single switching element of the FIG. 4 type, the output bus 13 of FIG. 6 is the same as the output bus 11 from the switch fabric 8 of FIG. 1.

As previously indicated in connection with FIG. 2, when a packet signal in the forward direction is selected by the output module 15 of FIG. 6 for transmission over the output bus 42, to an output controller 7 (see FIG. 1), then the output controller receiving the forward packet signal on bus 42 returns an acknowledge signal on the reverse path 41 which is received by the reverse unit 32 of FIG. 6. Upon receiving a reverse acknowledge signal on the return path 41, the reverse unit 32 transmits a reverse signal to the reverse bus 39 corresponding to the accepted one of the input packet signals as determined by the acceptance determining unit 31. The reverse acknowledge signal on bus 39 connects back through the bus connection means 16-1 to the selected one of the input modules 14 and in turn to the originating one of the input controllers 6.

As previously described in connection with FIG. 2, the acknowledge signal appears on the return path 52 to an input latch 22 to set the input latch to indicate that the transmitted packet signal has been accepted by the output controller.

Figure 7:
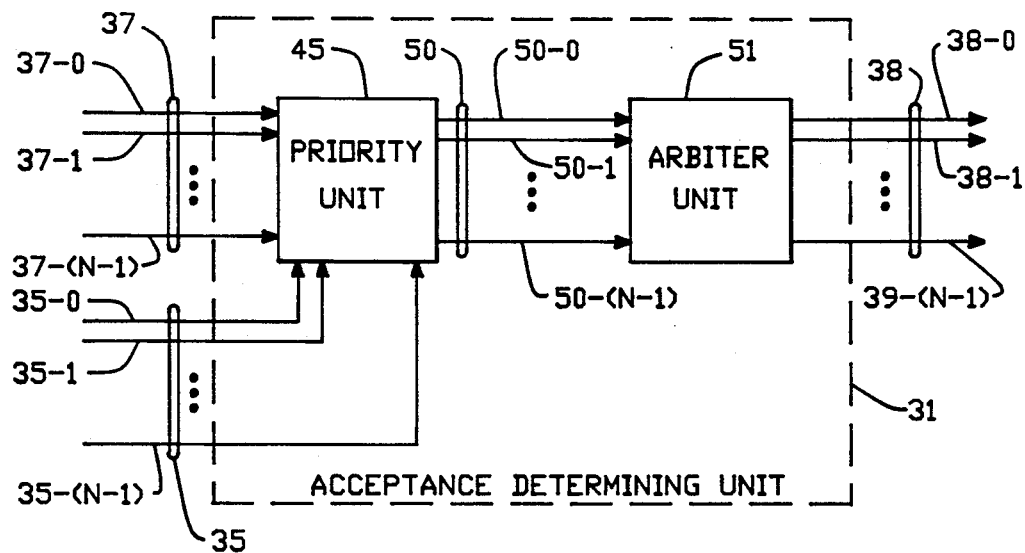
FIG. 7 depicts an acceptance determining unit which is part of the output module of FIG. 6.

Acceptance Determining Unit—FIG. 7

In FIG. 7, the acceptance determining unit within the output module of FIG. 6 is shown in further detail. The determining unit 31 includes a priority unit 45 and an arbiter unit 51. The priority unit 45 receives the input bus 37 including the lines 37-0, 37-1, . . . , 37-(N-1) from the route detector unit 30 of FIG. 6. One or more of the lines 37 may be asserted and the route detector unit 30 of FIG. 6 determines that input packet signals from the inputs 10 and input modules 14 of FIG. 4 are competing for access to a particular one of the output modules 15 of FIG. 4. Accordingly, from to N of the input lines 37 may be asserted in that none or up to N of the input modules may be requesting the particular output module of FIG. 6 including the determining unit of FIG. 7.

In FIG. 7, the bus 35 in turn is made up of the N buses 35-0, 35-1, . . . , 35-(N-1). Bus 35-0 contains the priority tag information derived from the bus 43-0 (see FIG.5 and FIG. 6). Similarly in FIG. 7, the bus 35-1 contains the priority tag information from the bus 43-1 of FIG. 5 as connected through the input unit 26 of FIG. 6. The bus 35-(N-1) in FIG. 7 includes the priority tag information from the bus 43-(N-1) of FIG. 5 as connected through the input unit 26 of FIG. 6.

Each of the priority buses 35-0, 35-1, 35-(N-1) includes one or more priority bits which define a priority level for the input packet signals on the input lines 10. The priority unit 45, for each one of the inputs on line 37 requesting access to the output module, checks the corresponding priority for the requesting input on the corresponding one of the priority buses 35. The one or more requesting inputs on line 37 having the highest priority cause outputs to be asserted on a corresponding one or more of the output lines 50. Specifically, if the input line 37-0 indicates that the input 10-0 and input module 14-0 of FIG. 5 have an input packet signal competing for acceptance by the output module 15 of FIG. 6, then the priority unit 45 of FIG. 7 senses that the input line 37-0 is asserted. The priority unit 45 checks the priority level on bus 35-0, which carries the priority level for packet signals from the input module 14-0 of FIG. 5. If the priority on bus 35-0 for the requesting packet signals represented by the asserted line 37-0 is as high as any other priority for other asserted lines 37, then the output line 50-0 is asserted. Similarly, if the priority of a requesting signal on line 37-1, as represented by the priority tag on bus 35-1, is of the priority level as high as any other priority at that time, then the output line 50-1 from the priority unit 45 is asserted. Any number of outputs 50 from 0 to N may be asserted from the priority unit 45.

In FIG. 7, the requesting input packet signals of the highest priority level then asserted are represented by the signals on lines 50 to the arbiter unit 51. Arbiter unit 5 determines which one or more of the asserted highest priority requesting signals on lines 50 is to be selected. In the particular embodiment described, only one output from the arbiter unit 51 is permitted at a time when more than one of the inputs on lines 50 are asserted.

Accordingly, only one of the output lines 38, that is, one of the lines 38-0, 38-1, . . . , 38-(N-1), is asserted during a common time period.

By way of example, if the input 50-1 and others of the inputs 50 are asserted, and arbiter unit 51 selects the input 50-1 as the one to be accepted by the determining unit 31 and the output module of FIG. 6, then output line 38-1 is asserted and all of the other outputs 38 are not asserted. Accordingly, either one or none of the outputs are asserted at any one time and the particular one asserted corresponds the one of the requesting input packet signals which is to be accepted by the output module 15 of FIG. 6.

The output lines 38 in FIG. 7 connect, as previously described in connection with FIG. 6, to the reverse unit 32 and to the enable unit 31. The particular one of the asserted outputs from arbiter unit 51 in FIG. 7 selects one of the packet signals in FIG. 6 from the input unit 26 on bus 34 to be connected to output bus 36. Specifically, enable unit 33 will select information through input unit 26 from one of the N buses 43-0, 43-1, 43-N-1) to be forwarded to an output controller. The information from the selected one of the input buses 43 may, of course, be latched in the input unit 26. Input unit 26 may, of course, include multi-stage buffers so that more than one input packet signal, from each of the input buses 43, can be latched in the input unit 26. Alternatively, in the simplest design, input unit 26 merely connects the input buses 43 to the output buses 34 and enable unit 33 selects one of those buses for connection to bus 36. Similarly, the output unit 27 receiving the bus 36 from the enable unit 33 may include multiple buffer stages for queueing packet signals or may simply connect bus 36 directly to output 42.

The outputs 38 from the determining unit 31 of FIG. 7 also connect as an input to the reverse unit 32. The reverse unit 32 connects the reverse signal path 41 to one of the reverse signal paths in the reverse signal path bus 39. The reverse signal path 41 is connected to the one of the reverse signal paths in the bus 39 corresponding to the selected one of the input packet signals determined by the determining unit 31.

In FIG. 6, the enable unit 33 selects from the input unit 26 both the packet data signals and the packet control signals (tags) Which are to be forwarded from the output module on bus 42. In the embodiment in which the switch fabric 8 of FIG. 1 includes multiple stages of switching elements, the forward bus 42 includes the forward packet control signals (tags) which are to be utilized by subsequent stages of switching elements. For example, if the output module of FIG. 6 is in the first stage, then the input unit 26 selects the control signals on lines 29 and 35 which are appropriate for first stage switching elements. The subsequent cascaded stages have the tag signals connected from bus 43 to bus 34 to bus 36 to output bus 42 as an input to the next switching element. If the output module 15 of FIG. 6 is in the second stage, then the signals on lines 29 and 35 from the input unit 26 are selected as appropriate for second stage modules. In this manner, each output module selects the appropriate tag signals for that stage. Any convenient manner for directing the control signals within each stage may be employed. For example, in a typical embodiment, if K bits per stage are required, and there are L stages, then the first stage switching receives KxL input bits and extracts the high order K bits. Each subsequent stage extracts the high order K bits until in the last stage all bits have been extracted. Any means of directing the control tags to the appropriate stage may be employed.

Figure 8:
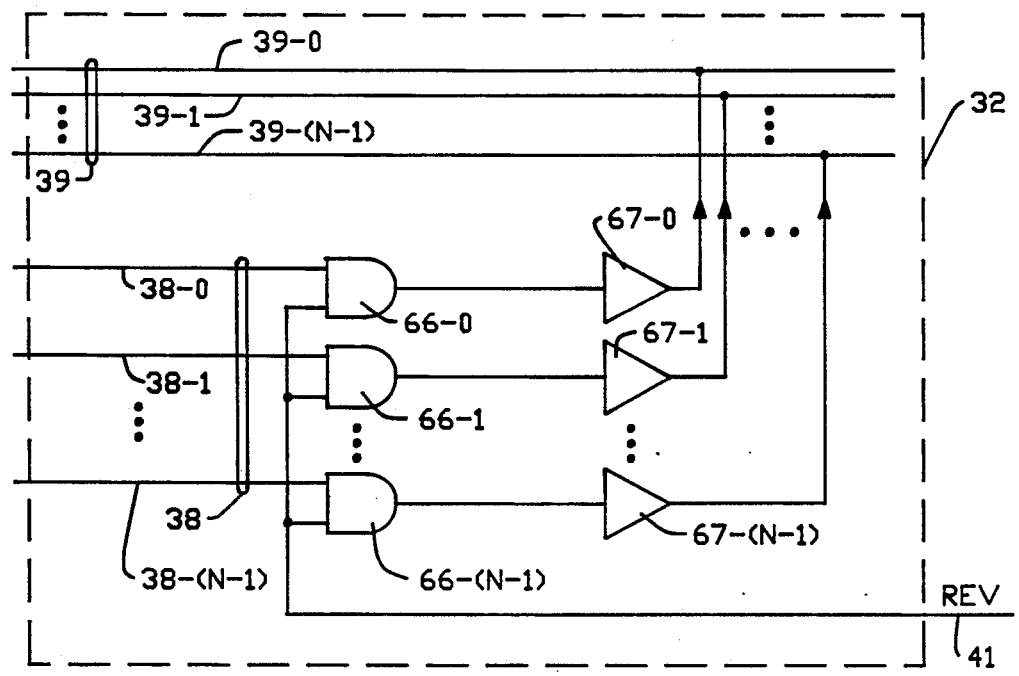
FIG. 8 depicts a schematic representation of the reverse unit, for acknowledge (ACK) reverse signals, which forms part of one embodiment of the output module of FIG. 6.

Reverse Unit—FIG. 8

In FIG. 8, further details of one embodiment of a reverse unit 32 in the output module 15 of FIG. 6 are shown. The reverse signal represents the acceptance state of input packets to be transmitted. The embodiment of FIG. 8 is for a system in which the acceptance state of the reverse signal on the reverse signal path 41 is an acknowledge signal (ACK). In FIG. 8, the lines 38 from the determining unit 31 of FIG. 7 are input to the AND gates 66. The input lines 38-0, 38-1, 38-(N-1) connect respectively to the AND gates 66-0, 66-1, ..., 66-(N-1).

In FIG. 8, only one of the AND gates 66 is enabled by the active one of the input lines 38. The outputs from the AND gates 66 connect as inputs to the wired-OR drivers 67 including drivers 67-0, 67-1, ..., 67-(N-1). Particularly, driver 67-0 has an input from AND gate 66-0 and similarly connections exist for each of the other drivers 67. If the input line 38-1 is the asserted input, then AND gate 66-1 is enabled to thereby enable the reverse signal path from line 41 to be connected through driver 67-1 to the line 39-1 on the reverse signal path bus 39. If the reverse signal on the reverse signal path 41 is asserted (logical 1) as an acknowledge signal (ACK), then the enabled AND gate 66-1 is satisfied to transmit the acknowledge signal (ACK) through driver 67-1 (as a logical 1) to the line 39-1. If no asserted acknowledge signal appears on the reverse signal path 41, then the lack of an asserted signal is transmitted by AND gate 66-1 (the output is not satisfied, logical 0) and hence driver 67-1 does not assert an acknowledge on line 39-1 because of the absence of an acknowledge on the reverse signal path 41. However, if line 39-1 already has an acknowledge signal (logical 1) from some other output module, that acknowledge signal is not modified by the presence or absence of an acknowledge signal from the AND gate 66-1 and driver 67-1. The effect of the AND gates 66 is to enable the reverse signal path on reverse signal path 41 for connection to the selected one of the lines in the reverse bus 39. If an acknowledge appears on line 41, that acknowledge is connected to the bus 39 for the enabled one of the input modules.

Figure 9:
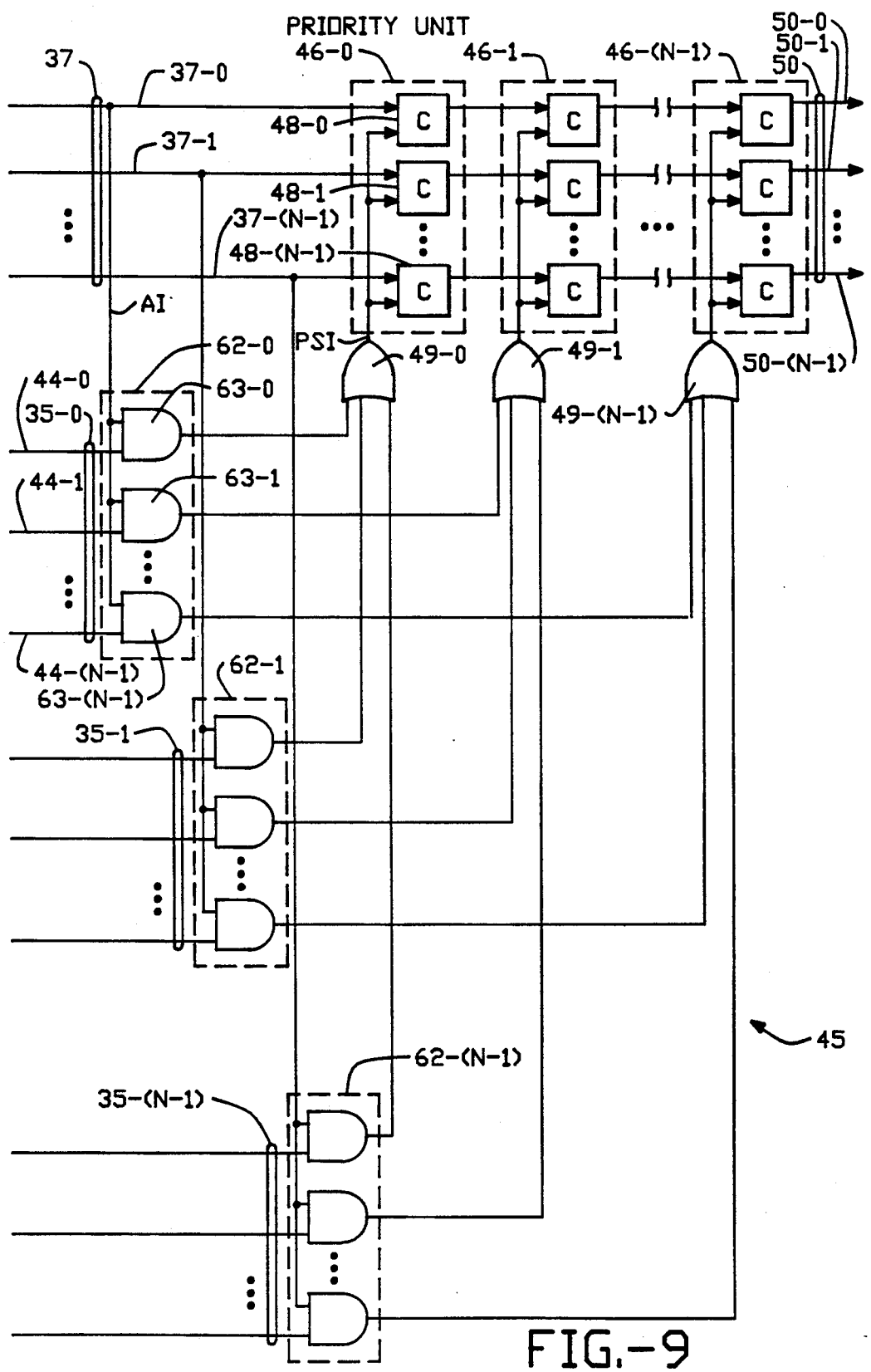
FIG. 9 depicts a parallel priority unit which is one embodiment of the priority unit in the determining unit of FIG. 7.

Priority Unit—FIG. 9

In FIG. 9, further details of a priority unit 45 within the acceptance determining unit 31 of FIG. 7 are shown. The priority unit 45 of FIG. 9 receives the input buses 35-0, 35-1, ..., 35-(N-1). Each input bus 35 connects to input AND gates 62. The input gates 62 are enabled by input lines 37 to select the priority bits for the requesting ones of the input packet signals as represented by active signals on the lines 37.

Specifically, when input module 14-0 (see FIG. 5) has a packet requesting access to a particular output module containing the priority unit of FIG. 9, line 37-0 enables the AND gates 63-0, 63-1, ..., 63-(N-1). AND gates 63 receive each of the bits of the priority tag associated with the packet signals represented by line 37-0 and derived from input module 14-0 (see FIG. 5). The most significant bit of the priority tag appears on input line 44-0 to gate 63-0 and is gated to the summing OR gate 49-0. Similarly, the next most significant bit for the priority tag associated with the input packet signal represented by line 37-0 appears on line 44-1 input to the AND gate 63-1 which, when enabled by an asserted signal on line 37-0, connects to the next stage summing signal in OR gate 49-1. Similarly, the least significant bit of the priority tag represented by the signal on line 37-0 appears on line 44-(N-1) input to the AND gate 63-(N-1) which, when enabled, connects its output to the summing OR gate 49-(N-1). In a similar manner, input packet signals represented by a signal on line 37-1 (input packet signals from the inputs 10-1 and module 14-1 of FIG. 5) have a priority tag on bus 35-1. The AND gates 62-1, when enabled by the signal on line 37-1, connect the priority bits from the most significant bit to the OR gate 49-0 to the next most significant bit to OR gate 49-1 and finally to the least significant bit to OR gate 49-(N-1). In a similar manner, each of the other priority tags is connected from most significant bit to least significant bit to the OR gates 49-0, 49-1, ..., 49-(N-1).

As indicated in FIG. 9, the OR gate 49-0 OR's the most significant bits from all of the priority tags on buses 35-0, 35-1, ..., 35-(N-1). Similarly, the OR gate 49-1 connects the next most significant bit from each of the priority buses 35. Finally, the OR gate 49-(N-1) collects all the least significant bits from the priority tags on the buses 35.

The OR gate 49-0 has an output whenever an asserted one of the input packet signals requesting access to the output module is active and has an asserted most significant bit. The stage 46-0 of the priority unit of FIG. 9 senses the asserted ones of the inputs on line 37 in the comparators 48. For example, comparator 48-0 compares the signal on line 37-0 with the output from the OR gate 49-0 to provide a first stage output to the comparator in the next stage 46-1. If any of the most significant bits in a selected one of the input packets represented by the lines 37 is asserted, then gate 49-0 will have an asserted output. That asserted output is compared with the corresponding state of each of the lines 37 in the comparators 48. Comparators 48, in one embodiment, are EXCLUSIVE-OR gates. The operation of the priority unit is explained with reference to the following table.

TABLE

| AI | PI | PSI | CO |
|----|----|-----|-----|
| 1  | 1  | 1   | 1   |
| 1  | 0  | 1   | 0   |
| 1  | 0  | 0   | 1   |
| 0  | —  | —   | 0   |

In the above table, the active in (AI) column represents the input on one of the lines 37, for example, from line 37-0. The priority in (PI) column represents the priority bit input, for example, on line 44-0. The priority sum input (PSI) column represents the output from one of the OR gates, for example, gate 49-0. The comparator output (CO) column represents the output from one of the comparators 48, for example, comparator 48-0.

The effect of the first stage comparator 46-0 is to pass to the second stage all of the asserted signals on lines 37 which have the most significant bit set to a state that is the same as for other most significant bits of equal priority level and not to pass to the second state most significant bits of lower priority level. If the highest priority level is a logical 1, and at least one of the priority most significant bits is a 1, then only the asserted ones of the lines 37 having a corresponding logical 1 for the most significant priority bit Will provide an asserted output from the comparators 48. In a similar manner, each of the subsequent stages 46-1 through 46-(N-1) examine corresponding priority bits in each of the priority tags. Their surviving outputs appear on the output lines 50-0, 50-1, ..., 50-(N-1).

In FIG. 9, for each of the input lines 37 which is asserted, there will be a corresponding one of the output lines 50 asserted for those lines having a corresponding priority tag equal to the highest level priority tag among any of the priority tags on the tag buses 35. Accordingly, the output lines 50 can have from 0 to N lines asserted. If all N output lines 50 are asserted, then all input lines 37 are asserted and the priority tags on each of the buses 35 are equal. If the number of output lines 50 asserted is less than the number of input lines 37 asserted, then the fewer number asserted output lines results because the non-asserted outputs correspond to lower priority tags on the buses 35.

Figure 10:
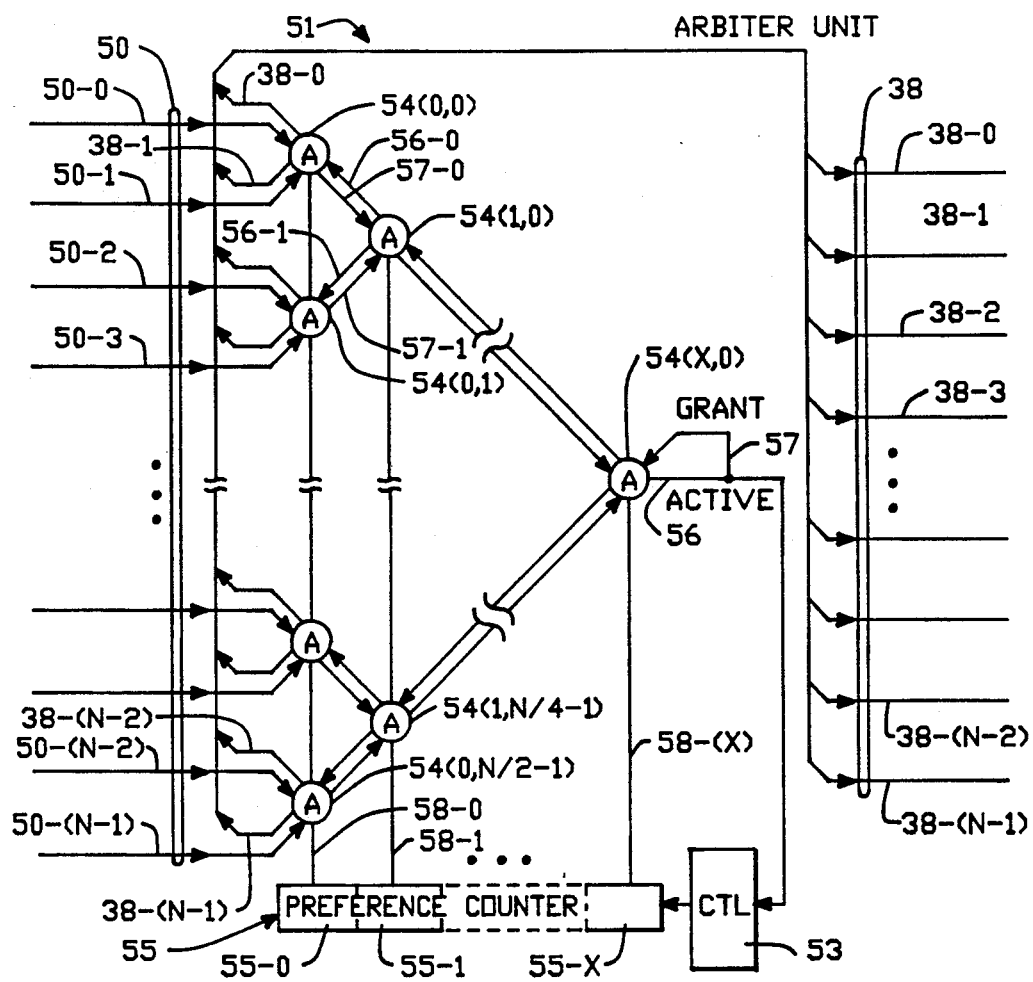
FIG. 10 depicts an arbiter unit which forms part of the acceptance determining unit of FIG. 7.

Unit—FIG. 10

In FIG. 10, further details of the arbiter unit 51 of FIG. 7 are shown. The output lines 50 from the priority unit of FIG. 9 are input to the arbiter unit of FIG. 10. Specifically, the FIG. 10 arbiter unit has a binary tree structure in which the lines 50 from the priority unit of FIG. 9 are connected in pairs to input arbiter blocks 54. For example, the lines 50-0 and 50-1 are input to the arbiter block 54(0,0). The input lines 50-2 and 50-3 are input to the arbiter block 54(0,1). Similarly, the lines 50-(n-2) and 50-(N-1) are input to the arbiter block 54(0,N/2-1). These inputs 50 are forward input signals in pairs to the arbiter blocks 54. Each arbiter block 54 has two output reverse signals on the forward input side. For example, the arbiter block 54(0,0) has the reverse signals 38-0 and 38-1. In a similar manner, the arbiter block 54(0,N/2-1) has the reverse signals 38-(N-2) and 38-(N-1).

In FIG. 10, each arbiter block 54 also includes two signals on the forward output side including a forward output signal and a reverse input signal. For example, the arbiter block 54(0,0) includes a reverse signal input 56-0 and a forward signal output 57-0. In a similar manner, the arbiter block 54(0,1) includes a forward signal output 57-1 and a reverse signal input 56-1. The next stage of the tree structure of FIG. 10 again is like the first stage. For example, in the second stage, the arbiter block 54(1,0) includes two forward inputs, 57-0 and 57-1, and two reverse outputs, 56-0 and 56-1.

Similarly, the arbiter block 54(1,0) has both a forward output and reverse input. The arbiter blocks are connected in binary stages as shown in FIG. 10 until the last arbiter block 54(x,0). The arbiter block 54(x,0) has a forward output 56 which is connected to the reverse input 57. Reverse input 57 connects back through all the reverse signal paths to activate one and only one of the reverse outputs 38 from one of the arbiter blocks 54(0,0), ..., 54(0,N/2-1) in the first stage of the FIG. 10 tree.

Each of the arbiter blocks in FIG. 10 also receives a preference counter input which determines which of the forward two active inputs at any stage is selected for the single output. Specifically, the stage 55-0 output from the preference counter 55 provides an input to each of the first stage arbiter blocks 54(0,0), ..., 54(0,N/2-1). For the arbiter block 54(0,0), either the input line 50-0 or the input line 50-1 will be connected, if both are active, as the forward output 57-0 as a function of the logical state (logical 1 or logical 0) of the preference counter stage 55-0. Similarly, either the forward input 57-0 or 57-1 from the arbiter block 54(1,0), if both are active, will be selected as the forward output as function of the logical state of the second counter stage 55-1. Finally, the last stage, represented by the arbiter block 54(x,0) has its output 56 controlled by the last stage 55-x of the preference counter 55. The preference counter 55 is changed only after an active signal is output on line 56 and after the return signals have been transmitted to the output lines 38. Control 53, in one embodiment, includes a random number generator for randomly setting the preference counter 55 so that arbitration through the arbiter unit of FIG. 10 is on a random basis.

Each of the arbiter blocks 54 selects the forward output between the competing two inputs based on the preference counter value only if both inputs to the arbiter block are asserted. If only one input is asserted, then the asserted one on the input is the selected output. If neither of the inputs to an arbiter block are asserted, then the forward output from an arbiter block is not asserted. In this manner, the arbiter unit of FIG. 10 selects one and only one of the competing inputs as a selected output by asserting one of the output lines 38. For example, if the input line 50-1 is asserted and becomes selected by the arbiter unit, the output line 38-1 is correspondingly asserted.

Figure 11:
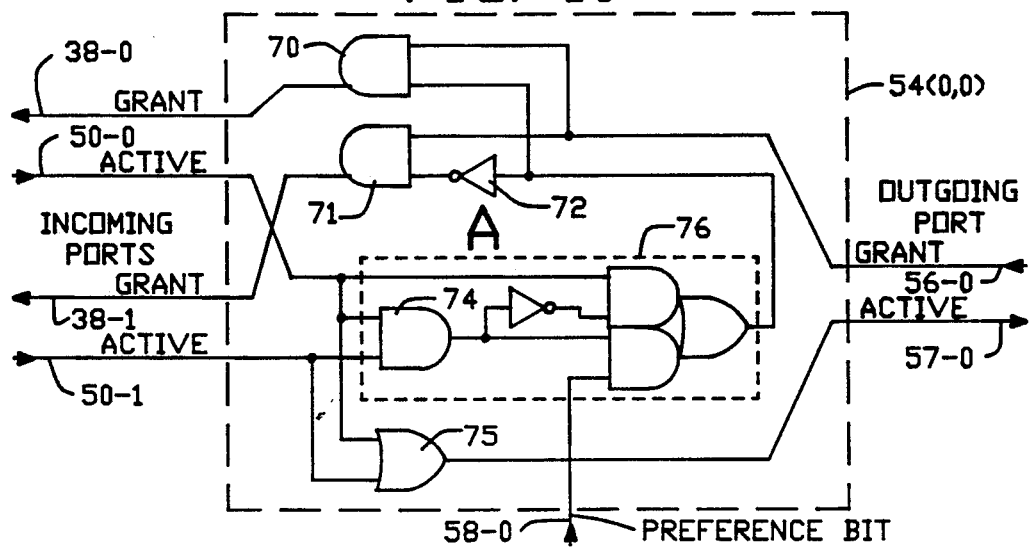
FIG. 11 depicts a typical one of the arbitration blocks which are employed in the arbiter unit of FIG. 10.

Arbiter Block—FIG. 11

In FIG. 11, arbiter block 54(0,0) of FIG. 10 is shown as typical of all of the arbiter blocks 54 in FIG. 10. In FIG. 11, the input lines 50-0 and 50-1 are the forward inputs which are asserted as active signals when the corresponding outputs from the priority unit of FIG. 9 are asserted. The reverse inputs on lines 38-0 and 38-1 connect as the lines of the output bus 38. The input lines 50-0 and 50-1 each connect to the AND gate 74 and to the OR gate 75. If either of the inputs 50-0 or 50-1 is asserted, then the output on 57-0 is asserted and if neither of the inputs is asserted, then the output 57-0 is not asserted.

If one or the other of the inputs 50-0 or 50-1 is asserted, but not both, then the corresponding AND gate 70 or 71 will be enabled by the output from logic block 76. If both of the inputs 50-0 and 50-1 are asserted, the AND gate 74 in logic block 76 is satisfied so that the selection of which one of the AND gates 70 or 71 will be enabled is a function of the preference bit 58-0 from counter 55 of FIG. 10.

Figure 12:
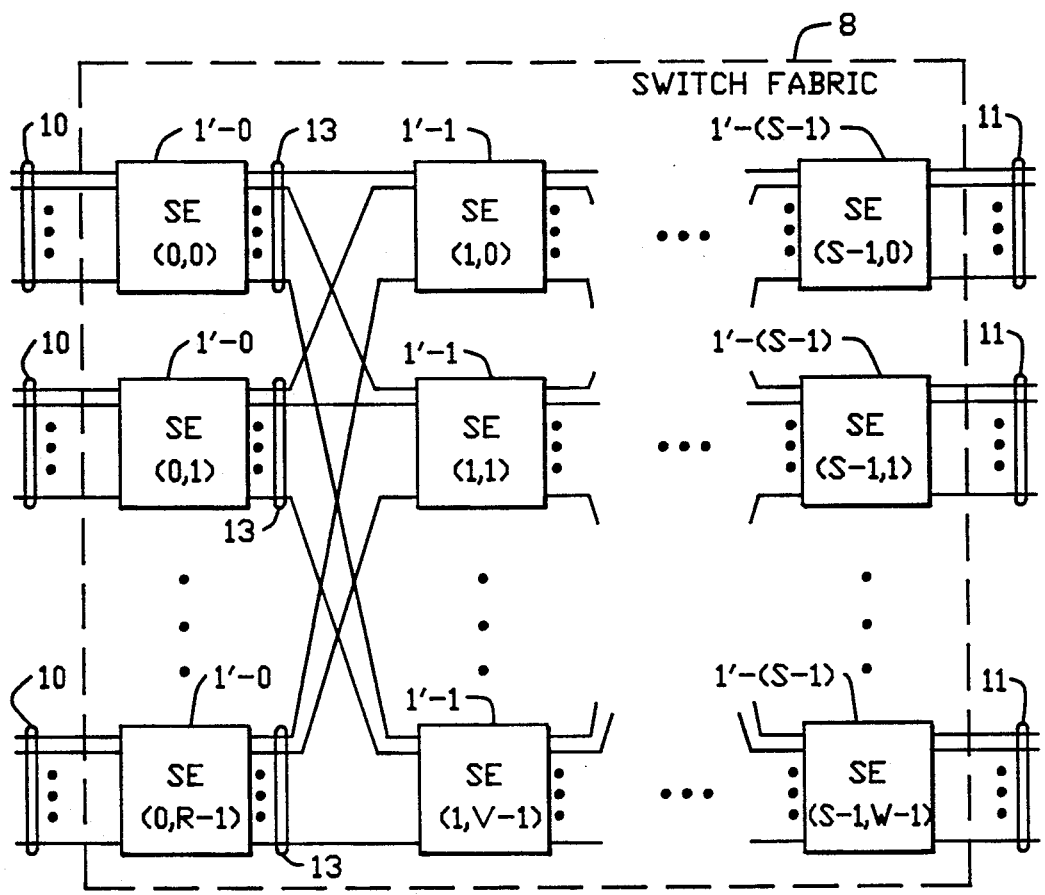
FIG. 12 depicts a schematic representation of a switch fabric array formed of stages of bus switching elements of the FIG. 4 type.

Expanded Switch Fabric—FIG. 12

In FIG. 12, an expanded switch fabric 8 typical of a practical communication system is shown. The switch fabric 8 of FIG. 12 includes a plurality of switching elements 1' like the switch element of FIG. 4. The switch fabric of FIG. 12 is organized in cascaded stages including a first stage including the switching elements 1'-0 designated as SE(0,0), SE(0,1), ..., SE(0,R-1). Each of the switch elements in the first stage 1'-0 of FIG. 12 has bi-directional input controller inputs 10 like those previously described in connection with FIG. 1, FIG. 2 and FIG. 4. If each of the switching elements of the first stage 1'-0 includes N inputs 10, then the switch fabric of FIG. 12 includes a total of RxN bi-direction switch fabric inputs. Similarly, each of the switch elements in the first stage 1'-0 of FIG. 12 includes bi-directional outputs 13 of the type shown in FIG. 4. Each one of the switching elements 1'-0 in the first stage has an output 13 that connects to the switching elements in the second stage of switching elements 1'-1. Accordingly, each switching element in the first stage 1'-0 is connected to switching elements in the second stage 1'-1. The switch fabric stage of FIG. 12 includes one or more intermediate stages like the stage 1'-1 cascaded until the last stage 1'-(S-1). Each stage has outputs from switching elements connected as inputs to the switching elements of the next stage in a cascaded fashion. The outputs 1 from the last stage 1'-(S-1) connect to the output controllers 7 as shown in FIG. 1.

With the switch fabric of FIG. 12, any number of input controllers and input ports can be connected in a self-routing fashion to any number of output controllers and output ports.

Figure 13:
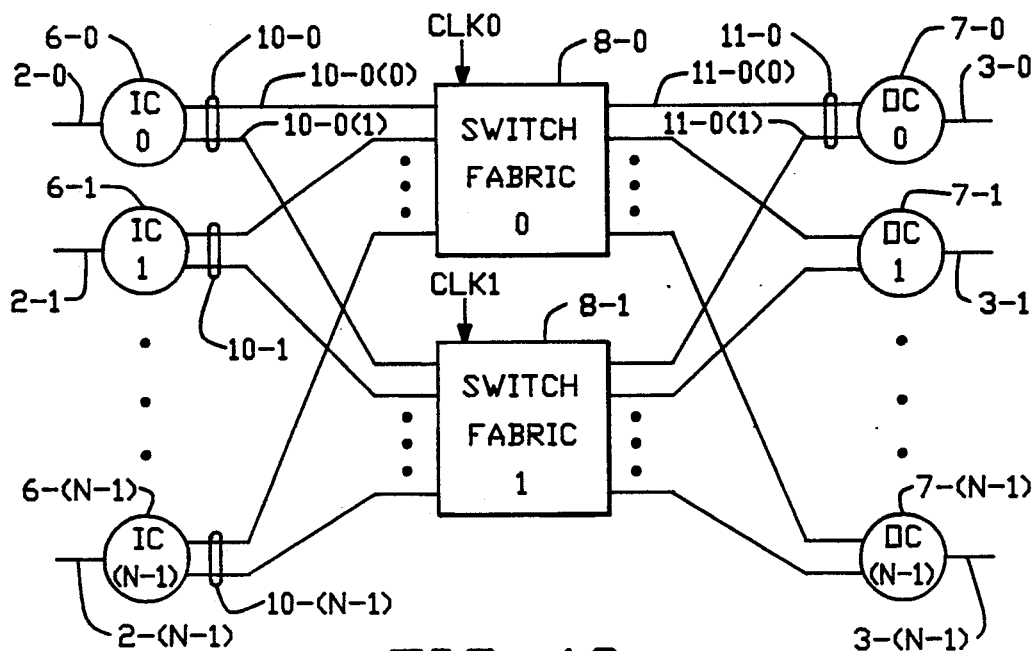
FIG. 13 depicts an alternate embodiment of the FIG. 1 communication system employing parallel switch fabrics between the input controllers (IC) and output controllers (OC).

Multi-plane Switch Fabrics—FIG. 13

In FIG. 13, two or more switch fabrics 8 of the FIG. 1 or FIG. 12 type are connected in parallel between input controllers 6 and output controllers 7. The switch fabrics 8 are substantially identical to the switch fabrics previously described except that they ar operated with a time shift relative to each other whereby input packets which fail to be connected through one of the switch fabrics 8 may attempt connection through another one of the switch fabrics. Switch fabric 8-0 is timed by the CLKO signal and switch fabric 8-1 is timed by the CLK1 signal from the control unit 4.

In FIG. 13, each of the input controllers 6 includes a plurality of connection paths 10, one path for each switch fabric 8. In one particular embodiment of FIG. 13, only two switch fabrics, switch fabric 8-0 and switch fabric 8-1, are employed. When two switch fabrics are employed, the input controllers include two outputs. If N switch fabrics were employed, then each of the input controllers includes N connection paths, one for each of the switch fabrics 8. In a similar manner, each of the output controllers includes a connection path, one for each of the switch fabrics. Accordingly, in one FIG. 13 embodiment With two switch fabrics, each of the output controllers 7 includes two connection paths 11-0(0); 11-0(1); 11-1(0), 11-1(1); . . . ; 11-(N-1)(0), 11-(N-1)(1) one for each of the switch fabrics 8-0 and 8-1.

Figure 14:
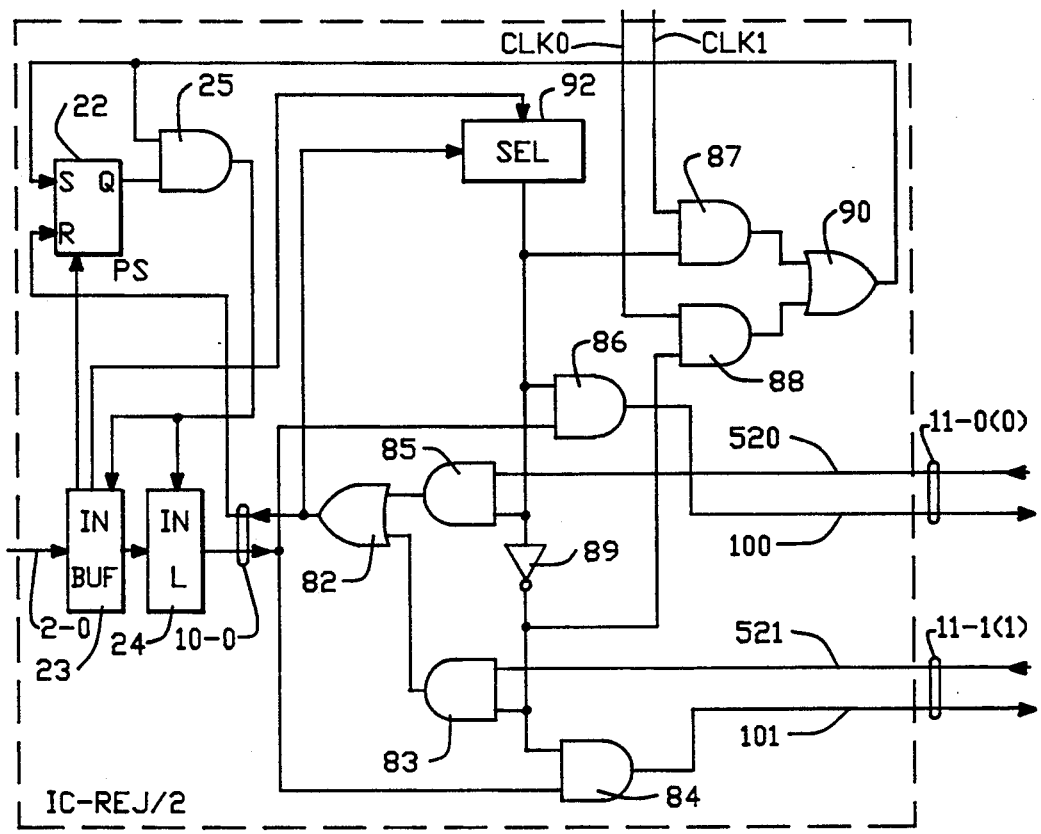
FIG. 14 depicts a schematic representation of an input controller which is particularly useful in connection with the communication system of FIG. 13.

Dual Output/Input Controller—FIG. 14

In FIG. 14, a dual input controller of the type employed in the multi-plane switch fabric of FIG. 13 is shown where FIG. 13 is a two plane switch fabric.

In FIG. 14, the input buffer 23, the input latch 24, the set/reset latch 22, and the AND gate 25 function in a manner analogous to that of the input controller of FIG. 2. However, the FIG. 14 input controller operates with reverse signals which are rejection signals (REJ)as distinguished from the input controller of FIG. 2 which operates with reverse signals which are acknowledge signals (ACK). In FIG. 1, a rejection signal, when received from either reverse line 520 of the connection path 13-0(0) or reverse line 521 of the connection path 13-0(1), connects through the OR gate 82 to the reset (R) input of the latch 22. Accordingly, upon receipt of a rejection signal, AND gate 25 is disabled by the output of the latch 22 and inhibits the input buffer 23 and the input latch 24 from advancing to the next input packet. Alternatively, in the absence of a rejection signal, latch 22 is not reset and hence AND gate 25 remains enabled to advance the next input packet as the output from buffers 23 and 24 to the connection path 10-0.

In FIG. 14, two clock signals, CLK0 and CLK1, are derived from the control unit 4 of FIG. 13. CLK0 is input to the AND gate 88 and CLK1 is input to the AND gate 87. One or the other of the AND gates 87 or 88 is enabled. The enabled one of the clock signals, CLK0 or CLK1, is connected through the enabled AND gate to the OR 90 to the set (S) input of the latch 22. Each clock signal from the OR gate 90 sets the latch 22 to enable the AND gate 25 to proceed to the next input packet. However, if a rejection signal is received before the next clock signal from gate 90, AND gate 25 is disabled and the clock from gate 90 will not advance a packet through the buffer 23 and latch 24. Since CLK0 and CLK1 are shifted in time, a rejection signal received back from one of the reverse signal paths 520 or 521 will permit the same input packet previously output to one of the connection paths (for example, path 100) to be output to the other of the connection paths (for example, path 101). The determination of which output path 100 or 101 is selected is under control of a selection unit 92. In one embodiment, selection unit 92 includes a bistable latch circuit which is set in one or the other of two states. When one state is output from selection circuit 92, the AND gates 85, 86 and 87 are enabled and in the other state the AND gates 83, 84 and 88 are enabled. Accordingly, AND gates 87 and 88 are alternately enabled to transmit the CLK0 and CLK signals, AND gates 86 and 84 are alternately enabled to select forward outputs 100 and 101 and AND gates 83 and 85 are alternately enabled to select the reverse signal paths 520 and 521 from connection paths 13-0(0) and 13-0(1). Selection circuit 92 receives the signal from the OR gate 82 so as to switch states upon receipt of a rejection signal. Upon switching states, the selected clock is switched, and the outputs on buses 100 and 101 are switched as well as the reverse signal inputs from lines 520 and 521. Whenever the input controller newly receives packet signals, input buffer 23 provides an output signal which designates that a packet has been received for transmission. The PS signal presets the latch 22 to enable initial transmission.

Figure 15:
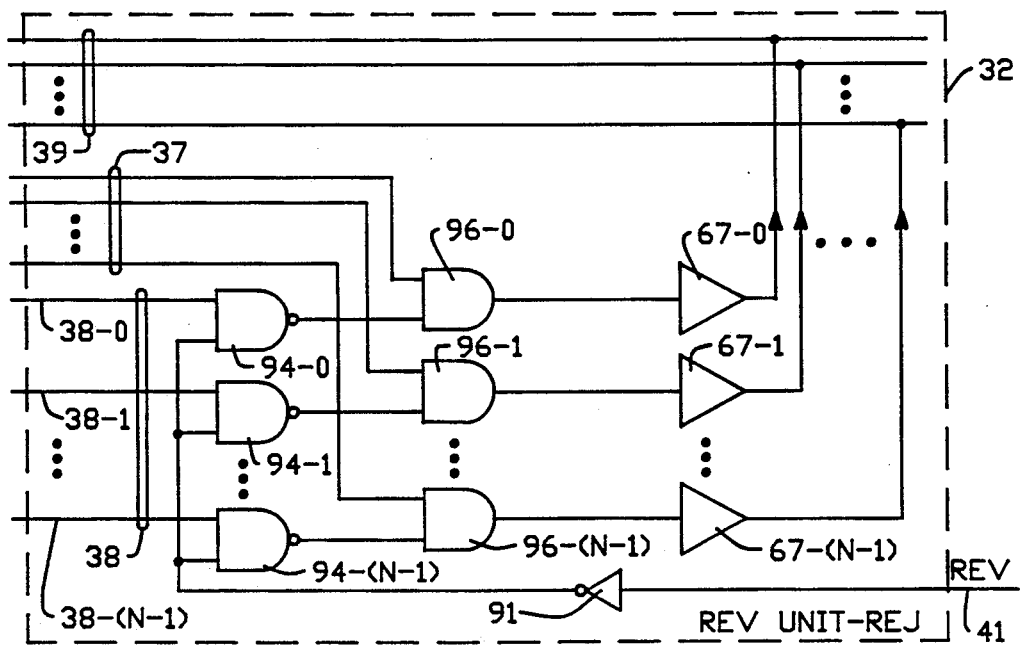
FIG. 15 depicts an alternate embodiment of the reverse unit which forms part of the output module of FIG. 6 and which is particularly useful in connection with the communication system of FIG. 13 when the reverse signals are rejection signals.

Reverse Unit For Rejection Signals—FIG. 15

In FIG. 15, a reverse unit 32 for use in the output module of FIG. 6 is shown as an alternate embodiment for the reverse unit of FIG. 8. The embodiment of FIG. 15 is for a system in which the acceptance state of the reverse signal on the reverse signal path 41 is a rejection signal (REJ). In FIG. 5, the reverse signal on reverse line 41 is inverted in invertor 91 to provide inputs to the NAND gates 94-0, 94-1, . . . , 94-(N-1). The NAND gates 94 each receive a different one of the input lines 38. In FIG. 15, only one of the lines 38 is asserted indicating which one of the packet signals is to be accepted as determined by the determining unit 31 of FIG. 6. All of the NAND gates 94 corresponding to a non-asserted input line 38 are forced to have a logical out indicating that they are candidates for a rejection signal. AND gates 96 are enabled by the input lines 37 which, when asserted, identify which ones of the inputs are requesting access. For those inputs requesting access as identified by the asserted inputs on line 37 and for those requesting inputs not accepted as indicated by a non-asserted state of the lines 38, the corresponding outputs from AND gates 96 will be rejection signals (logical which drive the corresponding drivers 67-0, 67-1, . . . , 67-(N-1). Accordingly, every asserted and non-selected input will provide a corresponding rejection signal on one of the lines of the reverse bus 39. For the particular one, if any, of the input lines 38 selected, the NAND gate 94 will have an output corresponding to the reverse signal on the reverse line 41. If the reverse line 41 is a rejection signal (logical 1), then the corresponding output from the requesting and selected AND gate 96 will be the same (logical 1). Accordingly, the reverse unit of FIG. 15 connects the reverse signal, for the accepted one of the requesting inputs, on the reverse bus 39 with the same level as the reverse signal on reverse input line 41. All other requesting but rejected inputs provide a rejection signal (logical 1) on the reverse bus 39. Non-requested inputs do not modify the state of the corresponding line of the reverse bus 39.

The reverse unit of FIG. 15 has an advantage in the multi-switch fabric embodiment of FIG. 13 because rejection signals can be generated by any switching element in a switch fabric of the FIG. 12 type. Accordingly, in many instances an early rejection signal from one switching element will cause the input controller of the FIG. 14 type to switch transmission from one rejected path (for example, path 101) to another path (for example, path 100) without having to wait to determine if an acknowledgment signal will be generated by an output controller and propagated back through the switch fabric to the input controller. Of course, a rejection signal embodiment of the FIG. 15 type can be employed even in a single switch fabric with one or more switching elements. Similarly, acknowledgment reverse signals can be employed in the multi-switch embodiment of FIG. 13.

Figure 16:
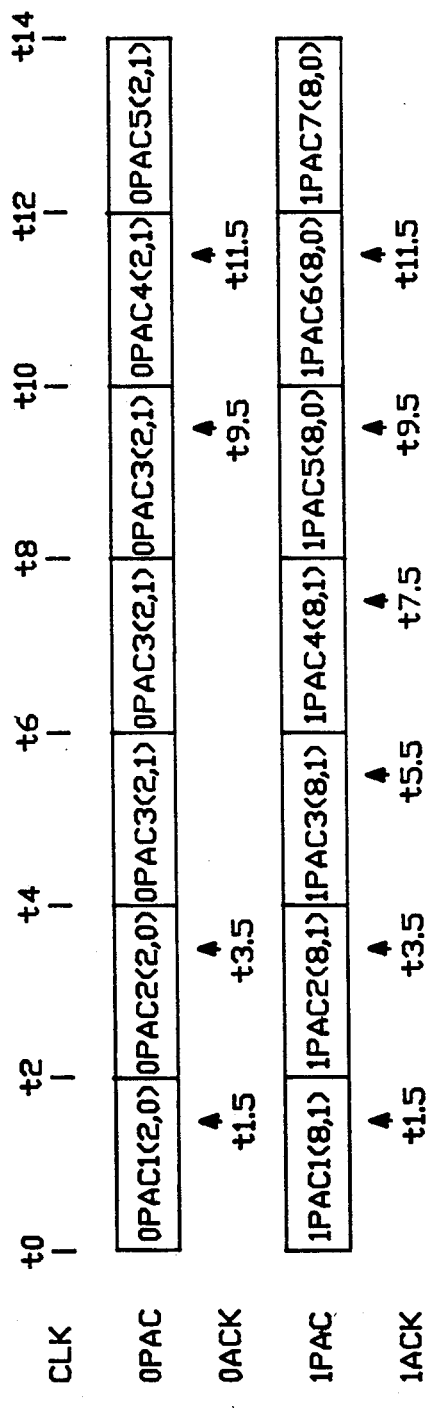
FIG. 16 depicts a timing diagram representative of the operation of the FIG. 1 system with a single switch fabric.

Single Switch Fabric Timing—FIG. 16

In FIG. 16, the clock signal CLK representing the transit time from an input controller 6 to an output controller 7 in the packet switch of FIG. 1 can initiate a new packet at each clock time t0, t2, t4, t6, t8, t10, t12, and so on. Referring to FIG. 2 and FIG. 16, at t0 the input buffer 23 senses for an input controller 0 the presence of a first input packet designated 0PAC1(2,0) and presets the latch 22 so that 0PAC1(2,0)is transmitted at t0 time through the switch fabric 8 to the output controller 7-0 with priority 2. At t1.5 time a 0ACK signal is received which resets latch 22 and enables for controller 0 the next packet, 0PAC2(2,0) to be transmitted at t2 time toward output controller 0 with priority 2. At t2 time, the CLK signal in FIG. 2 from the clock unit 4 resets the latch 22. At t3.5, the 0ACK signal is received again setting latch 22 enabling OPAC3(2,1) to be transmitted toward controller 1 with priority 2 by the clock at t4. At t4, the clock CLK resets latch 22. At t6, no acknowledge signal (OACK) has been received and hence latch 22 has not been reset so that 0PAC3(2,1) is retransmitted and remains output from the latch 24.

In FIG. 16, a second input controller such as input controller 6-1 of FIG. 1 has an input queue of packet signals for output to output controller 7. Specifically, at t0, the 1PAC2(8,1) packet is transmitted into the switch fabric 8 with a priority 8 and with a destination output controller 7-1. At time t1.5, the 1ACK signal is received acknowledging the acceptance of the first packet by the output controller 7-1. Accordingly, at t2, the next packet 1PAC2(8,1) is transmitted to the switch fabric 8 with a priority of 8 and with a destination of output controller 7-1. At t3.5, the 1ACK signal is received thereby causing the next packet to be output to the switch fabric at t4. At t4, the packet 1PAC3(8,1) is transmitted to the switch fabric 8 with a priority 8 and a destination of output controller 7-1. As previously described, however, the input controller 6-0 was concurrently at the same common time period between t4 and t6 transmitting the packet OPAC3 2,1) into the switch fabric 8 with a priority of 2 and a destination of output controller 7-1. Since both the 0PAC3(2,1) packet and the 1PAC3(8,1) packet have the same destination during a common time period t4 - t6), the priority and selection circuitry of the present invention examines the priority of the packets. Since the packet 1PAC3(8,1) has the highest priority, its transmission is accepted with the acknowledgment signal 1ACK at t5.5 whereas the packet 0PAC3(2,1) is not accepted and does not have an acknowledgment signal.

Accordingly, at t6, the 0PAC3(2,1) packet signal from the controller 6-0 is retransmitted to the switch fabric together with the new packet 1PAC4(8,1) from the input controller 6-1. Again, the packets from the controllers 6-0 and 6-1 at time t6 have the same destination and hence the 1PAC4(B,1) packet again with higher priority is accepted with an 1ACK signal at t7.5. Again, the packet from the input controller 6-0 is not accepted and does not receive an acknowledgment signal. Accordingly, at t8, the input controller 6-0 again transmits the 0PAC3(2,1) packet and the controller 6-1 transmits the packet 1PAC5(8,0). Since, at t8, the packets from the input controller 6-0 and 6-1 have different destinations, each packet receives an acknowledgment signal at t9.5 and transmission continues uninterrupted.

The OACK and 1ACK signals in FIG. 16 are each generated by the particular ones of the output modules 7 receiving the packet signals and the acknowledge signals are transmitted over the reverse signal paths of the switch fabric to the input controllers 6-0 and 6-1 of FIG. 2, as the case may be.

Figure 17:
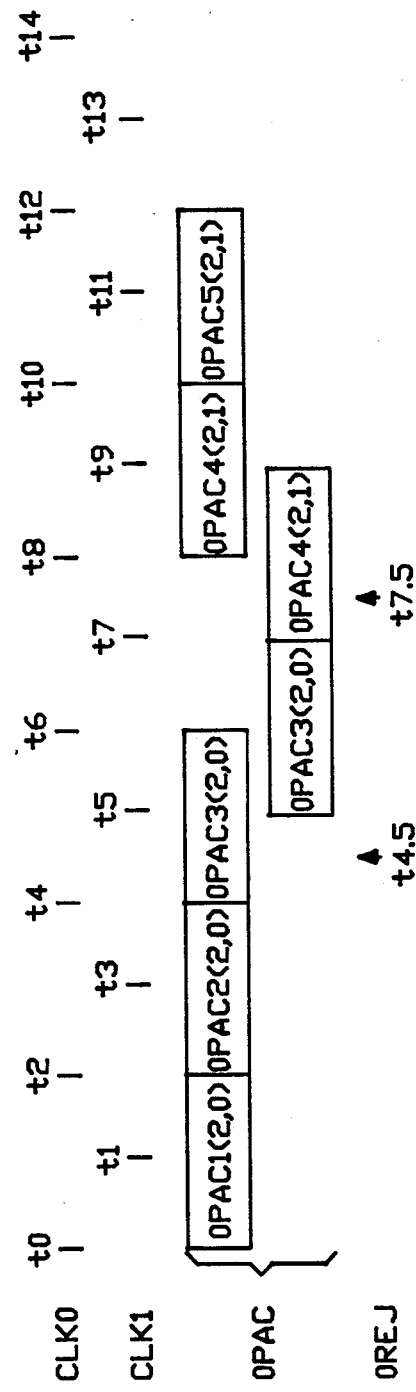
FIG. 17 depicts a timing diagram representative of the operation of the FIG. 1 system with two switch fabrics of the FIG. 13 type.

Dual Switch Fabric Timing—FIG. 17

In FIG. 17, the CLK0 signal occurs at the t0, t2, t4, and so on, times (like the CLK signal in FIG. 16). In FIG. 17, the CLK1 signal is skewed half a cycle occurring at the t1, t3, t5, t7, t9, t11, and so on times. At CLK0 t0 time, the input buffer 23 of FIG. 14 has preset the latch 22 to enable AND gate 25 to output 0PAC1 to the output bus 10-0. Since no rejection signal is received before t2, latch 22 remains set and gate 25 enabled to output OPAC2 at t2 time and similarly without rejection, 0PAC3 is output at t4 time. At t4.5, the 0REJ rejection signal is received causing an output from OR gate 82 to gate the selection circuit 92. Selection circuit 9 2 switches clocks and connection paths so that 0PAC3 is output on the second output to switch fabric 1 at t5. The t5 clock signal is selected and sets latch 22 and since no rejection signal is received before t7, OPAC4 is output at t7 to switch fabric 1. At t7.5, a rejection signal 0REJ is received causing 0PAC4 to be retransmitted to switch fabric 0 at t8. No rejection signal is received and OPAC5 is output at t10 to switch fabric 0. Since no rejection signal is received, 0PAC5 is output at t10 to switch fabric 0.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A self-routing switching element for use in a packet switch including a plurality of inputs each adapted to receive input packets during a synchronous time period Where each incoming packet signal has tags, the improvement comprising:
 a plurality of output modules where each output module has an output for transmission of received packet signals from the input modules, each particular output module including,
  detector means for detecting that a particular one of said input modules has a particular one of said incoming packet signals for transmission to said particular output module,
  determining means for determining if said particular output module will accept said particular one of said incoming packet signals,
  enable means responsive to said determining means for enabling the transmission of said particular one of said incoming packet signals for acceptance by said particular output module,
 bus connection means connecting each input to each output module whereby each input packet signal may be connected to each output module,
 control means for providing common clock signals to each of said output modules to clock said output modules in packet synchronous mode.

2. The self-routing switching element of claim 1 wherein each output module includes one of said determining means and one of said enable means whereby each output module determines the acceptance and transmission of the incoming packet signals.

* * * * *